US007627161B2

(12) United States Patent
Shimizu et al.

(10) Patent No.: US 7,627,161 B2
(45) Date of Patent: Dec. 1, 2009

(54) AUTHENTICITY DETERMINATION METHOD, APPARATUS AND PROGRAM

(75) Inventors: Tadashi Shimizu, Ashigarakami-gun (JP); Hajime Sugino, Ebina (JP); Kensuke Ito, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 686 days.

(21) Appl. No.: 11/287,345

(22) Filed: Nov. 28, 2005

(65) Prior Publication Data

US 2007/0122022 A1 May 31, 2007

(51) Int. Cl.
*G06K 9/00* (2006.01)
*G06K 15/00* (2006.01)
(52) U.S. Cl. ...................... 382/135; 358/1.14
(58) Field of Classification Search .................. 382/135; 358/1.14
See application file for complete search history.

(56) References Cited

U.S. PATENT DOCUMENTS

| 4,837,840 | A  | * | 6/1989 | Goldman | ..................... 382/135 |
| 7,457,961 | B2 | * | 11/2008 | Lapstun et al. | ............... 713/176 |
| 2005/0100204 | A1 | * | 5/2005 | Afzal et al. | .................. 382/135 |

FOREIGN PATENT DOCUMENTS

| JP | B 06-016312 | 3/1994 |
| JP | A 11-306411 | 11/1999 |
| JP | A 2000-094865 | 4/2000 |
| JP | A 2000-146952 | 5/2000 |
| JP | A 2000-182114 | 6/2000 |
| JP | A 2002-518608 | 6/2002 |
| JP | A 2003-242549 | 8/2003 |

* cited by examiner

*Primary Examiner*—Charles Kim
*Assistant Examiner*—Stephen R Koziol
(74) *Attorney, Agent, or Firm*—Oliff & Berridge, PLC

(57) ABSTRACT

An authenticity determination method and an apparatus for determining the authenticity of solid object having a random and readable intrinsic characteristic distributed on the surface thereof are disclosed. In this method and apparatus, reference data expressing the characteristic distributed on the genuine solid object are acquired, and cross-checking data expressing the characteristic distributed on the solid object to be determined for authenticity are derived. Further, on the basis of the reference data and the cross-checking data, correlation values of data expressing the characteristic distributed on either the genuine solid object or the solid objects to be determined for authenticity, with data expressing the characteristic distributed on the other solid object are calculated, and authenticity of the solid object to be determined for authenticity is determined on the basis of the maximum value of the correlation values obtained by the calculation and a characteristic quantity that expresses the shape of the distribution of correlation values obtained by repeating this calculation.

14 Claims, 18 Drawing Sheets

CROSS-CHECKING IMAGE
64×64 DOTS (4 MM VERTICALLY AND LATERALLY)

REFERENCE IMAGE
32×32 DOTS (2 MM VERTICALLY AND LATERALLY)

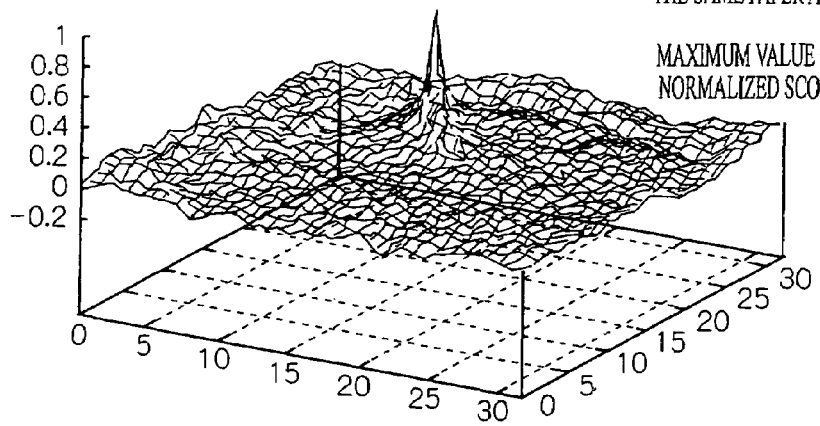

FIG. 3A  CALCULATION OF CORRELATION VALUES FOR THE SAME PAPER AND SAME IMAGE

MAXIMUM VALUE OF CORRELATION VALUES = 1.000
NORMALIZED SCORE = 16.322

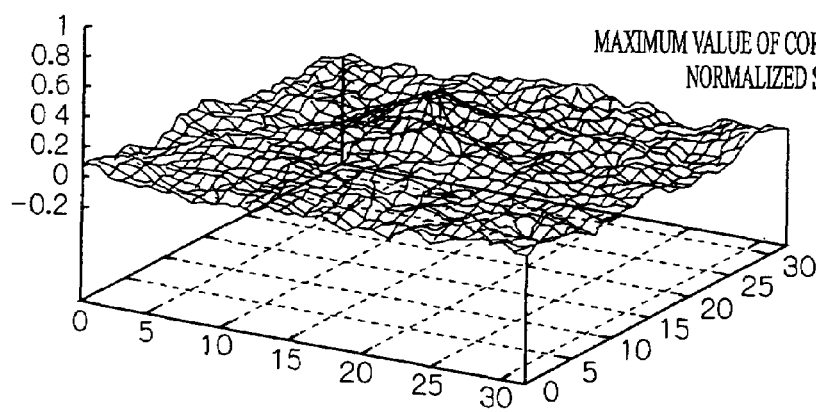

FIG. 3B  CALCULATION OF CORRELATION VALUES BY DEVIATING POSITION AND ROTATING FOR THE IN SAME PAPER

MAXIMUM VALUE OF CORRELATION VALUES = 0.427
NORMALIZED SCORE = 8.375

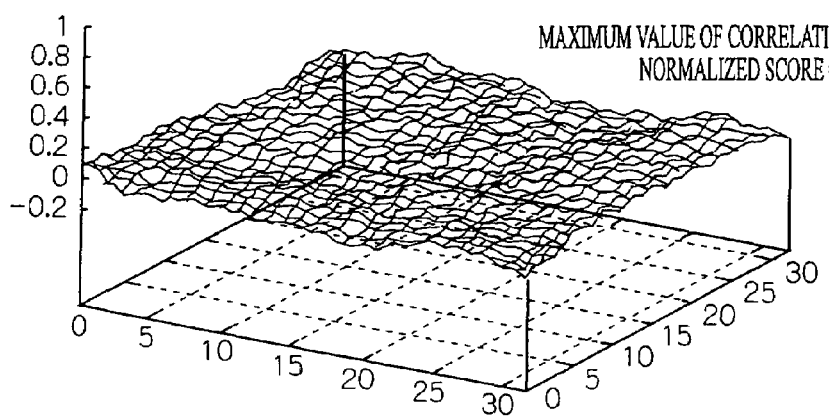

FIG. 3C  CALCULATION OF CORRELATION VALUES FOR A DIFFERENT PAPER

MAXIMUM VALUE OF CORRELATION VALUES = 0.162
NORMALIZED SCORE = 2.755

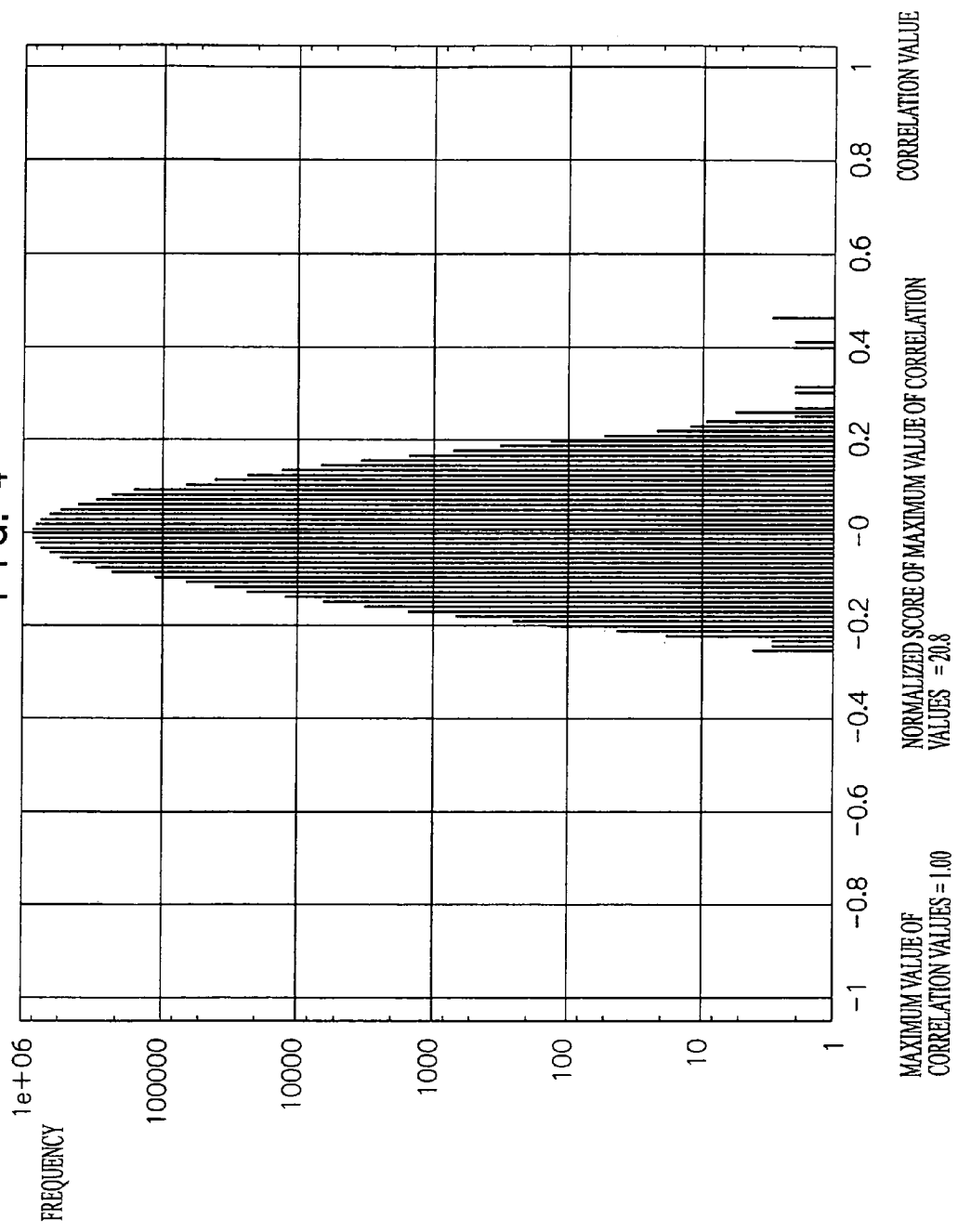

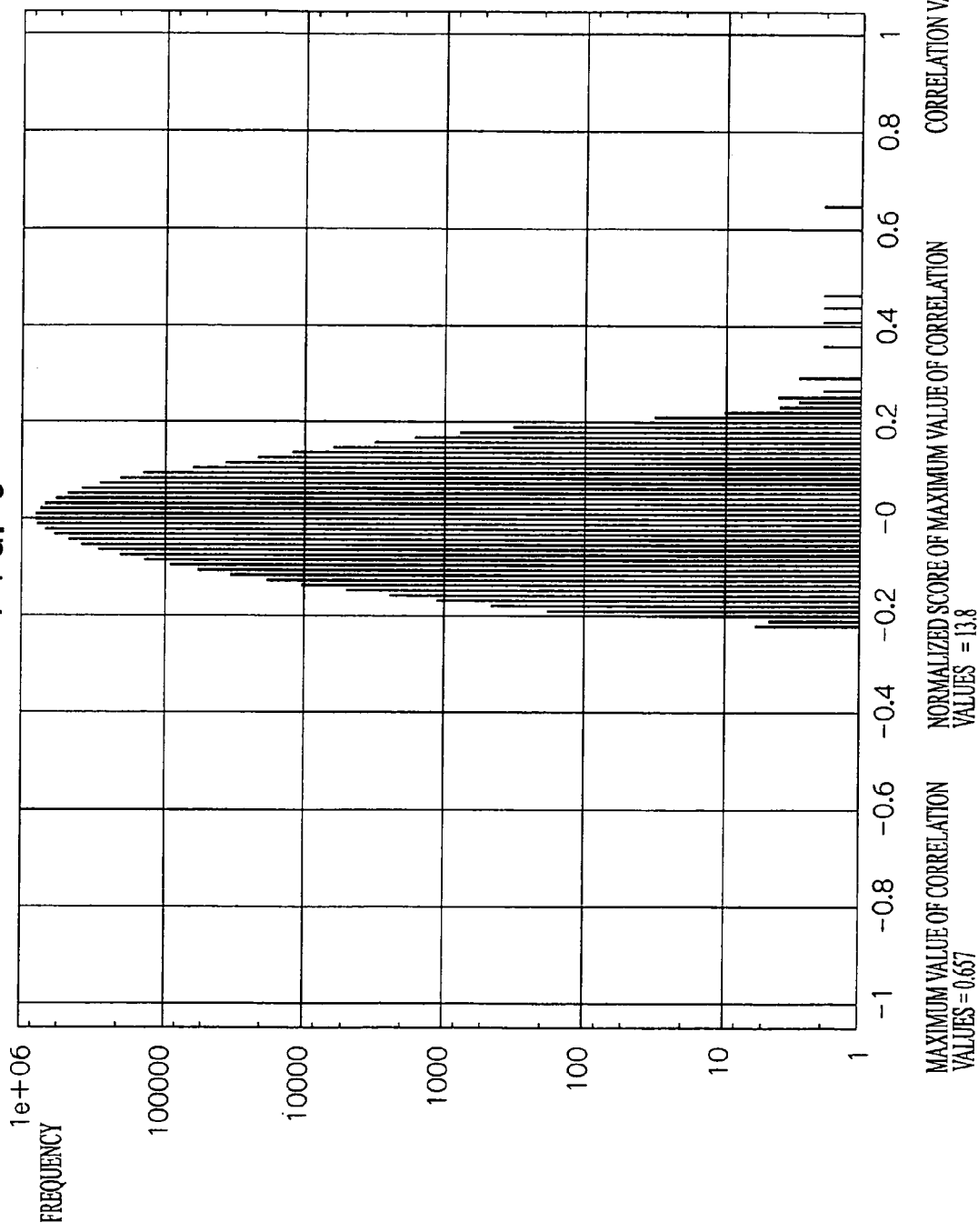

F I G. 1 1
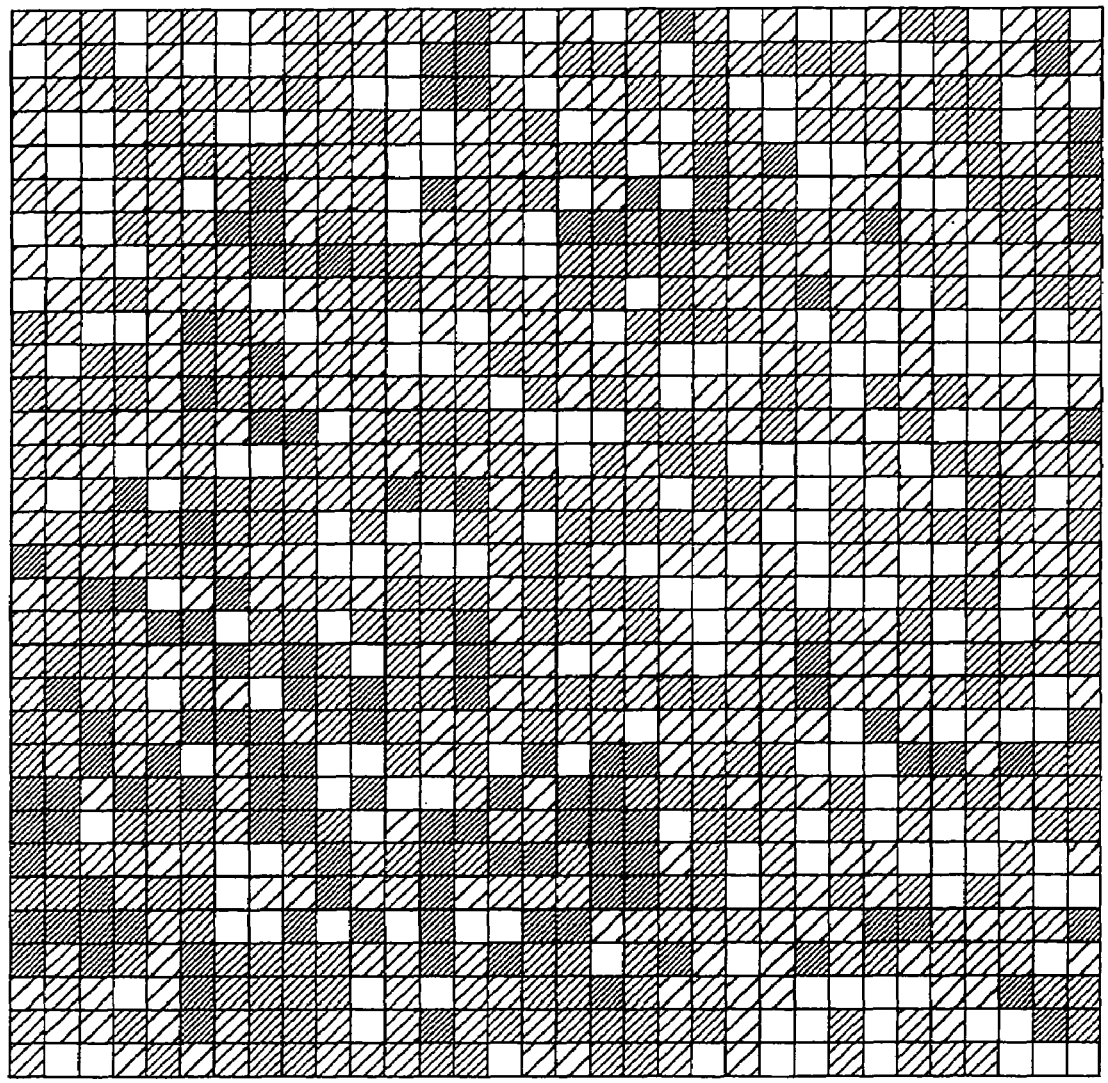

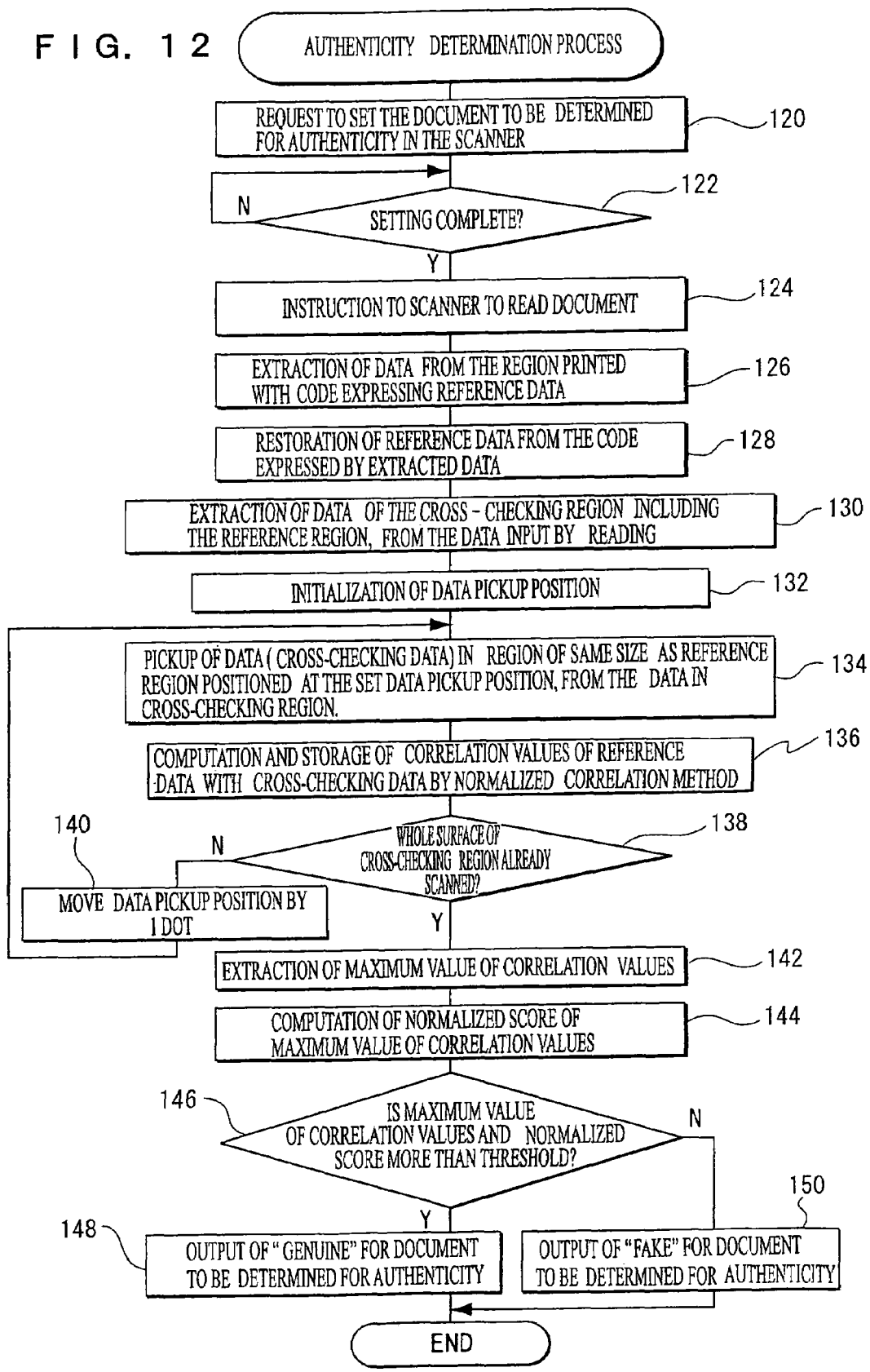

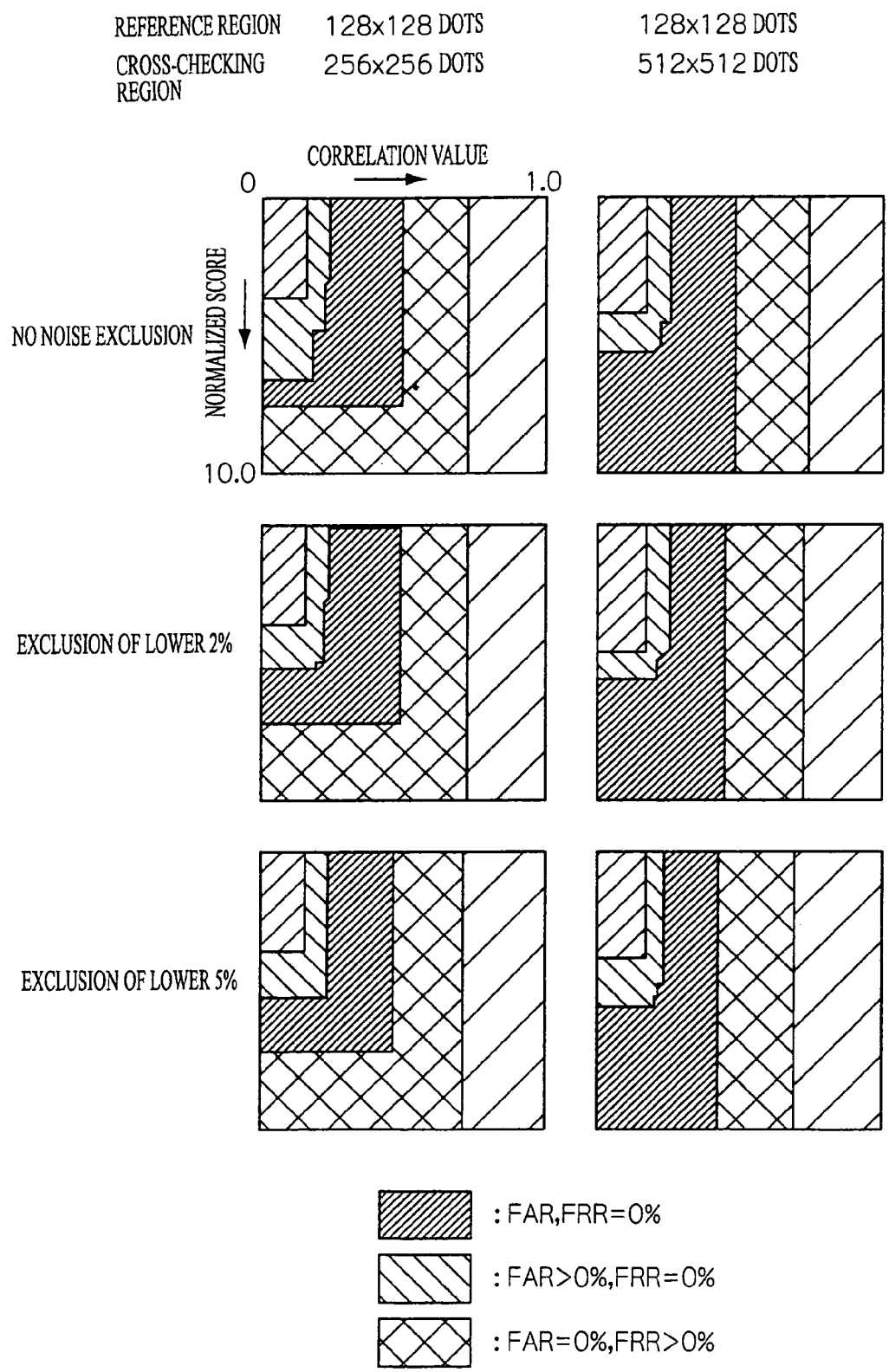

AUTHENTICITY DETERMINATION METHOD, APPARATUS AND PROGRAM

BACKGROUND OF THE INVENTION

1. Field of the Invention

The present invention relates to an authenticity determination method, apparatus and program, and more particularly to: an authenticity determination method for determining the authenticity of a solid object having a random readable unique characteristic distributed along the surface thereof; an authenticity determination apparatus applicable to the authenticity determination method, and a program for causing a computer to function as the authenticity determination apparatus.

2. Description of the Related Art

Recently, along with improved performance of copiers and printers, incidences are increasing of forged copies of banknotes and securities printed illegally by copiers and printers. Against such a background, to suppress illegal use of fakes and forged copies, there is a strong demand for establishment of technology capable of determining with high precision the authenticity of various paper documents (including, aside from banknotes and securities, for example, passports, deeds, certificates of residence, birth certificates, insurance policies, warranties, confidential papers, etc.).

A technology for determining the authenticity of paper documents is disclosed, for example, in Japanese Patent Application Laid-Open (JP-A) No. 2000-094865, in which a luminous substance, emitting light in an intrinsic wavelength region when illuminated with light in a specific wavelength region, is applied on a sheet of paper with local differences in the degree of opacity. Then light in the specific wavelength region is illuminated thereon, and the light emitted from the luminous substance is detected by a photo sensor, and authenticity is judged. Japanese Patent Application National Publication (Laid-Open) No. 2002-518608 discloses a technology for integrating a conductive marker substance (transparent conductive polymer, or conductive pigment, or combination thereof) with a paper web for document, security or banknotes.

JP-A No. 2000-146952 discloses a technology of analyzing the frequency of image data obtained from the light passing through or reflected by sample paper material, and deriving integrated data for plural wavelength regions from the data after frequency analysis, and determining the correlation with integrated data of a standard paper sample, thereby determining if the sample paper material is the same as the standard paper sample or not.

Japanese Patent Application Publication (JP-B) No. 6-16312 discloses a technology of dividing a specified area of a tag T into a multiplicity of square regions by making use of random changes of transparency of paper due to randomness of texture of fibrous material forming paper, detecting the transparency of six square regions selected at random, recording the detected transparency together with the addresses of the individual square regions as information. Then, by detecting the transparency of individual square regions specified by the recorded information when determining the authenticity, authenticity can be determined by comparing the detected results with the transparency indicated by the recorded information.

However, the technologies disclosed in JP-A No. 2000-094865 and Japanese Patent Application National Publication (Laid-Open) No. 2002-518608 are intended to prevent forging by applying a specific substance to paper to determine authenticity, and it is costly and a special device is needed for detecting the specific substance for determining the authenticity.

The technology disclosed in JP-A No. 2000-146952 is a technology for identifying paper by making use of the texture given to paper in the paper making process, or periodicity of patterns formed by paper making wires or the like. However when this technology is applied in authenticity determination of paper documents, if the same paper as in the manufacturing lot of the original paper document is obtained by someone of malicious intent, and copies of the content of the original made, these copies may be falsely judged to be original.

On the other hand, the technology disclosed in JP-B No. 6-16312 makes use of random changes of transparency of paper due to randomness of texture of fibrous material forming paper, and it is not necessary to provide the paper with special properties, and individual papers can be distinguished even if the papers are from the same manufacturing lot. In this technology, however, since authenticity is determined by comparing the transparency of a very small region of paper, it is highly possible that authenticity may be determined incorrectly if the position or direction of reading of the region on the paper is even only slightly different between reading when recording information and reading when determining the authenticity. Detection value of transparency is also influenced by not matching the quantity of light source when reading, or discoloration of paper due to ultraviolet rays or the like. The technology disclosed in JP-B No. 6-16312 also does not consider lowering the precision of determining the authenticity due to such events, and the precision of determination of authenticity is not sufficient.

SUMMARY OF THE INVENTION

The present invention is devised in the light of the above facts, and it is hence an object thereof to present an authenticity determination method, an authenticity determination apparatus, and a program capable of determining the authenticity of solid objects easily and at high precision.

The inventors have recognized that an intrinsic characteristic of a solid object with random distribution along the surface of the solid object, such as random changes in the transparency of paper, are useful for determining the authenticity of solid objects, and have hypothesized that, for improvement of the precision for determination of authenticity by making use of an intrinsic characteristic of a solid object, it may be effective to determine authenticity by making use of also of a characteristic amount that expresses the shape of distribution of derived multiple correlation values, in addition to the maximum value of derived correlation values, by deriving multiple correlation values, by moving the area of a region used for comparison for determining the authenticity (the region on the solid object on which the intrinsic characteristic is distributed), between the genuine solid object and the solid object to be determined for authenticity, and calculating the correlation values repeatedly when the region of small area is moved within a region of large area to obtain multiple correlation values.

Wrong judgments in authenticity determination include cases of determining a genuine object to be fake, and cases of determining a fake object to be genuine (the probability of determining a genuine object to be fake is called a false rejection rate (FRR), and the probability of determining a fake object to be genuine is called a false acceptance rate (FAR)). The inventors have continued experiments as follows to prove if the above hypothesis is valid in both cases of high probability of determining a genuine object to be fake and high probability of determining a fake object to be genuine.

That is, first, using a flat bed scanner, a reference region of 32×32 dots (about 2 mm×about 2 mm) of unprinted area of paper (original) is read at resolution of 400 dpi, and gradation of 8-bit gray scale, and the image data coming out from the scanner (this image data expresses random changes of transparency of paper in the reference region on the paper (original) derived from randomness of texture of fibrous material forming the paper) is stored as reference data. FIG. 1A shows reference data visualized as a reference image (the contrast is corrected to be easily recognized visually).

It is impossible to control the texture of fibrous material forming the paper at the time of manufacture, and the texture of fibrous material forming the paper can be assumed to be random. The texture of fibrous material forming the paper can be observed by using a transmission optical microscope. On the other hand, in the reference image shown in FIG. 1A, although the texture of fibrous material forming the paper cannot be observed, random patterns of darkness are formed due to random changes of transparency of paper derived from the randomness of texture of fibrous material forming the paper (possibly including effects of undulation of paper surface due to paper making conditions), and therefore the reference data corresponding to the reference image can be recognized as an intrinsic characteristic of the paper (original) in the reference region on the paper (original), that is, information showing random changes of transparency in the reference region on the paper (original).

Next, as a comparative example, a cross-check region (a region including the reference region) of 64×64 dots (about 4 mm×about 4 mm) of the paper used as the original is read, and the image data coming out of the scanner is stored as first cross-checking data. This first cross-checking data shows random changes of transparency of paper in the cross-check region of the paper (original). FIG. 1B shows first cross-checking data visualized as a cross-checking image.

As a case of high probability of determining a genuine object to be fake, the paper used as the original is slightly shifted in position from the time of obtaining the first cross-checking data, and is slightly rotated and put on the original platen of the scanner, and a cross-check region of 64×64 dots is read (as a result, a region slightly different in position and orientation from the reading region when obtaining the first cross-checking data is read), and the image data coming out of the scanner is stored as second cross-checking data. Further, as another comparative example, a cross-check region of 64×64 dots of a different paper from the paper used as the original is read, and the image data coming out of the scanner is stored as third cross-checking data.

Correlation values between first, second and third cross-checking images from the first, second and third cross-checking data against the reference image from the reference data are calculated. Specifically, as shown in FIG. 2, from the cross-checking image to be calculated, a partial region of the same size as the reference image (indicated as the correlation value calculating range in FIG. 2) is extracted, and the correlation value of the partial region against the reference image is calculated by normalized correlation method (see formula (1) below), and this operation is repeated with shifting of the position of partial region on cross-checking image by 1 dot (pixel) at a time in the X-direction and Y-direction.

$$F = \{f_i\}_{i=0}^{N-1}$$
$$G = \{g_i\}_{i=0}^{N-1}$$
$$\text{Correlation value} = \frac{\sum_{n=0}^{N-1}(f_n - f_{AVE})(g_n - g_{AVE})}{\sqrt{\sum_{n=0}^{N-1}(f_n - f_{AVE})^2}\sqrt{\sum_{n=0}^{N-1}(g_n - g_{AVE})^2}} \quad (1)$$

where F is the reference image (a set of reference data), $f_i$ is lightness values of individual pixels of the reference image, N is the total number of pixels of the reference image (and the partial region of the cross-checking image), G is the partial region of the cross-checking image (its set of data), $g_i$ is the lightness values of individual pixels of the partial region of cross-checking image, $f_{AVE}$ is the average of lightness values of individual pixels of reference image, and $g_{AVE}$ is the average of lightness values of individual pixels of the partial region of cross-checking image. By calculating the first, second and third cross-checking images as the cross-checking images to be calculated, supposing the number of dots of reference image to be m×n, and the number of dots of the cross-checking image to be M×N, (M−m+1)×(N−n+1) pieces of correlation values are obtained per single cross-checking image.

As a characteristic quantity expressing the shape of the distribution of correlation values, the normalized score of maximum value of correlation values is calculated in formula (2) below in succession for the first, second, and third cross-checking images.

Normalized score=(maximum value of the correlation values−average of the correlation values)/standard deviation of the correlation values (2)

FIGS. 3A and 3B show the calculation result of maximum value of correlation values and normalized score of maximum value of correlation values, together with a chart visually showing the relation between the position on the partial region of the cross-checking image and correlation values.

As shown in FIG. 3A, when the cross-checking image including the reference region on the same paper is read without shifting position or orientation, the maximum value of correlation values shows a very high value. The distribution of correlation values shows correlation values which are very low compared with the maximum value, in the portions other than the peak area showing the maximum correlation value, and accordingly, the normalized score of maximum value of correlation values also shows a very high value. When reading a paper different from the original, as shown in FIG. 3C, the maximum value of correlation values is a very low value, and distribution of correlation values shows low correlation values over the whole area including the peak area, and the normalized score of maximum value of correlation values also a very low value.

On the other hand, when reading a cross-check region including the reference region on the same paper by slightly shifting position and orientation (corresponding to a case with a high probability of determining a genuine object to be fake), the maximum value of correlation values and normalized score of maximum value of correlation values are intermediate values, as shown in FIG. 3B, between the case of reading the same paper without shifting position and orientation and the case of reading a different paper. Accordingly, as threshold values of maximum value of correlation values and normalized score of maximum value of correlation values, intermediate values of the values shown in FIG. 3B and the values shown in FIG. 3C are used (for example, threshold value of maximum value of correlation values is about 0.3, and threshold value of normalized score of maximum value of correlation values is about 5.0), and the authenticity can be judged by comparing the maximum value of correlation values and the threshold value, and by comparing the normalized score of maximum value of correlation values and the threshold value. Therefore in cases with a high probability of determining a genuine object to be fake due to slight shifting of the paper in position and orientation when reading the cross-check region, it can be seen that it is possible to enhance the determination precision of authenticity compared to a case of determination by using only the maximum value of correlation values.

The inventors continue the experiment by using the same scanner, by reading an arbitrary reference region of 32×32 dots of blank paper (original) at the same resolution and gradation to obtain reference data, and conducting a first comparative example, that is, the whole area of original paper is read, and from the image data obtained by reading, data of a cross-check region of 64×64 dots is extracted, and from the extracted cross-checking data, a partial region is further extracted, and the correlation between its data and reference data is calculated according to formula (1), and the operation is repeated by shifting the position of the partial region in the cross-check region by 1 dot at a time (as a result, more than 10 million pieces of correlation values are obtained).

In a second comparative example, the whole area of original paper is read, and it is then read again with slight shifting of position and by slight rotation in orientation. And as in the first comparative example, data of a cross-check region of 64×64 dots is extracted from the image data obtained by reading, and from the extracted cross-checking data, a partial region is further extracted, and the correlation between its data and reference data is calculated according to formula (1), and the operation is repeated by shifting the position of the partial region in the cross-check region by 1 dot at a time. In a third comparative example, using a different paper from the original paper, the operation of reading and calculation of correlation values is conducted in the same way as in the first and second comparative examples.

As a case of high probability of determining a fake object to be genuine, a reference region of original paper is read by an intentionally excessive quantity of light, and a partially whited out image showing changes of transparency in the reference region is obtained as second reference data. Approximately the whole area of the paper used in the third comparative examples is read out, data of a cross-check region of 64×64 dots is extracted from the image data obtained by reading, and from the extracted cross-checking data, a partial region is further extracted, and the correlation between this data and second reference data is calculated by the normalized correlation method according to formula (1), and the operation is repeated by shifting the position of the partial region in cross-check region by 1 dot at a time.

Distributions of correlation values obtained by these experiments are shown in FIG. 4 to FIG. 7 (logarithmic charts plotting correlation values on the abscissa and frequency on the ordinate). FIG. 4 refers to the first comparative example, FIG. 5 shows distribution of correlation values obtained in the second comparative example, and in both distributions, the majority of multiple correlation values are 0 or close to 0, but there is also data showing higher correlation values than specified (for example, 0.3 or more), and the maximum value of correlation values in the first comparative example is 1.00, and the maximum value of correlation values in the second comparative example is 0.657, and both values are high. It is seen that a genuine object can be determined to be a genuine object even only using the maximum value of the correlation values. FIG. 6 shows a distribution of correlation values obtained in the third comparative example, in which all correlation values are less than a specified value (for example, 0.3), and the maximum value of correlation values is also low, 0.254, and therefore a fake object can be determined to be a fake object even only using the maximum value of correlation values.

On the other hand, FIG. 7 shows a distribution of correlation values obtained by an experiment assuming a case of high probability of determination a fake object to be genuine, in which data that includes values showing higher correlation than the predetermined value (for example, more than 0.3) (maximum value of correlation values is 0.348), and it is possible that a fake object may be judged to be genuine if judged by using only the maximum value of correlation values. By contrast, as clear from comparison between distribution in FIG. 7 and distribution in FIG. 6, distribution of correlation values in FIG. 7 has a wide skirt, and accordingly the standard deviation of correlation values in the distribution in FIG. 7 is larger than in the distribution in FIG. 6, and as clear from formula (2), the value of normalized score of maximum value of correlation values in distribution in FIG. 7 is smaller than in distribution in FIG. 6 (normalized score of maximum value of correlation values in distribution in FIG. 6 is 5.32, and normalized score of maximum value of correlation values in distribution in FIG. 7 is 4.91), and it is understood that the risk of determination a fake object to be genuine can be avoided.

Thus, in a case of high probability of determining a fake object to be genuine (the case in FIG. 7), mis-determination can also be avoided by determining the authenticity by using both the maximum value of correlation values and the normalized score of maximum value of correlation values. Therefore by determining the authenticity by using the characteristic quantity showing the shape of the distribution of the correlation values, such as the normalized score of maximum value of correlation values, in addition to the maximum value of correlation values, it is confirmed that the precision can be enhanced in determination of authenticity.

A first aspect of the invention is an authenticity determination method for determination of the authenticity of solid objects having a random and readable intrinsic characteristic distributed on the surface thereof, comprising: acquiring reference data expressing the characteristic distributed on a genuine solid object, obtained by reading in advance the characteristic of the genuine solid object; deriving cross-checking data expressing the characteristic distributed on the solid object to be determined for authenticity by reading the characteristic of the solid object to be determined for authenticity; calculating, on the basis of the reference data and the cross-checking data, correlation values of data expressing the characteristic distributed in a first region of a specified size, on either the genuine solid object or the solid object to be determined for authenticity, with data expressing the characteristic distributed in a second region of the same size as the first region on the other solid object, and repeating this calculation when the position of the second region on other solid matter is moved within a region larger than the specified size; and determining the authenticity of the solid object to be determined for authenticity on the basis of the maximum value of the plural correlation values obtained by the calculations, and a characteristic quantity that expresses the shape of the distribution of correlation values derived from the plural correlation values.

A second aspect of the invention is an authenticity determination apparatus for determination of the authenticity of solid objects having a random and readable intrinsic characteristic distributed on the surface thereof, comprising: an acquiring unit for acquiring reference data expressing the characteristic distributed on a genuine solid object obtained by reading in advance the characteristic of the genuine solid object; a reading unit for deriving cross-checking data expressing the characteristic distributed on the solid object to be determined for authenticity by reading the characteristic of the solid object to be determined for authenticity; a calculating unit for calculating, on the basis of the reference data and the cross-checking data, correlation values of data expressing the characteristic distributed in a first region of specified size on either the genuine solid object or the solid object to be determined for authenticity, with data expressing the characteristic distributed in a second region of the same size as the first region on the other solid object, and repeating this operation when the position of the second region on other solid matter is moved within a region larger than the specified size; and a determination unit for determination of the authenticity of the solid object to be determined on the basis of the maximum value of plural correlation values obtained by the calculations, and a characteristic quantity that expresses the shape of the distribution of correlation values derived from the plural correlation values.

A third aspect of the invention is a program for causing a computer comprising a reading device for reading a random and intrinsic characteristic of a solid object distributed along the surface of the solid object, to execute comprising: an acquiring command for acquiring reference data expressing the characteristic distributed on a genuine solid object obtained by reading in advance the characteristic of the genuine solid object; a reading control command for deriving cross-checking data expressing the characteristic distributed on the solid object to be determined for authenticity by reading the characteristic of the solid object to be determined for authenticity; a calculating command for calculating, on the basis of the reference data and the cross-checking data, correlation values of data expressing the characteristic distributed in a first region of specified size on either the genuine solid object or the solid object to be determined for authenticity, and data expressing the characteristic distributed in a second region of the same size as the first region on the other solid object, and repeating this operation when the position of the second region on the other solid object is moved within a region larger than the specified size; and a determination command for determining the authenticity of the solid object to be determined on the basis of the maximum value of plural correlation values obtained by the calculation, and a characteristic quantity that expresses the shape of distribution of correlation values derived from the plural correlation values.

Other aspects, features and advantages of the present invention will become apparent from the ensuing description taken in conjunction with the accompanying drawings.

BRIEF DESCRIPTION OF THE SEVERAL VIEWS OF THE DRAWING

FIG. 3A, FIG. 3B, and FIG. 3C are diagrams showing distributions of correlation values in various conditions together with the maximum value of the correlation values and the normalized score;

FIG. 4 is a diagram showing a distribution of correlation values in a first example of comparisons in the experiment by the inventors;

FIG. 5 is a diagram showing a distribution of correlation values in a second example of comparisons;

FIG. 11 is an image showing an example of visualized reference data;

FIG. 12 is a flowchart of an operation of an authenticity determination process executed by a PC (authenticity determination apparatus);

FIG. 18 is an image view showing the relation between threshold values of maximum values of correlation values and normalized scores of maximum value of correlation values, and FAR and FRR, in an experiment using a reference region and a cross-check region without black spot noise.

DETAILED DESCRIPTION OF THE INVENTION

Figure 1B:
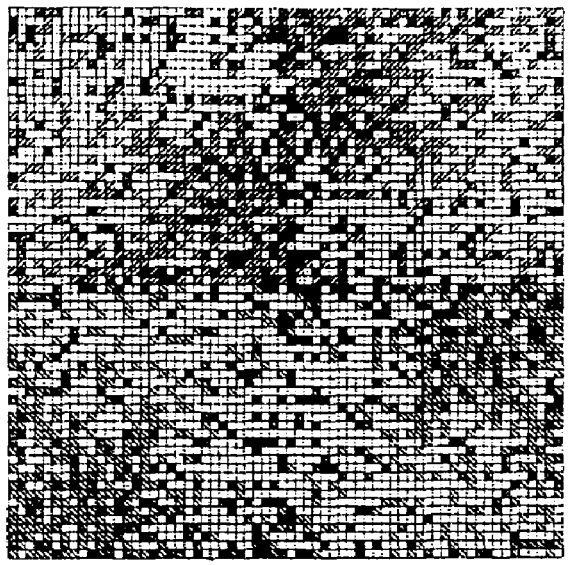
FIG. 1A and FIG. 1B are image views showing, respectively, examples of a reference image and a cross-checking image explaining the experiment conducted by the inventors.
Figure 1A:
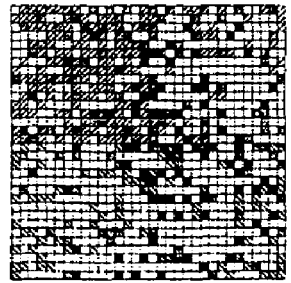
Figure 2:
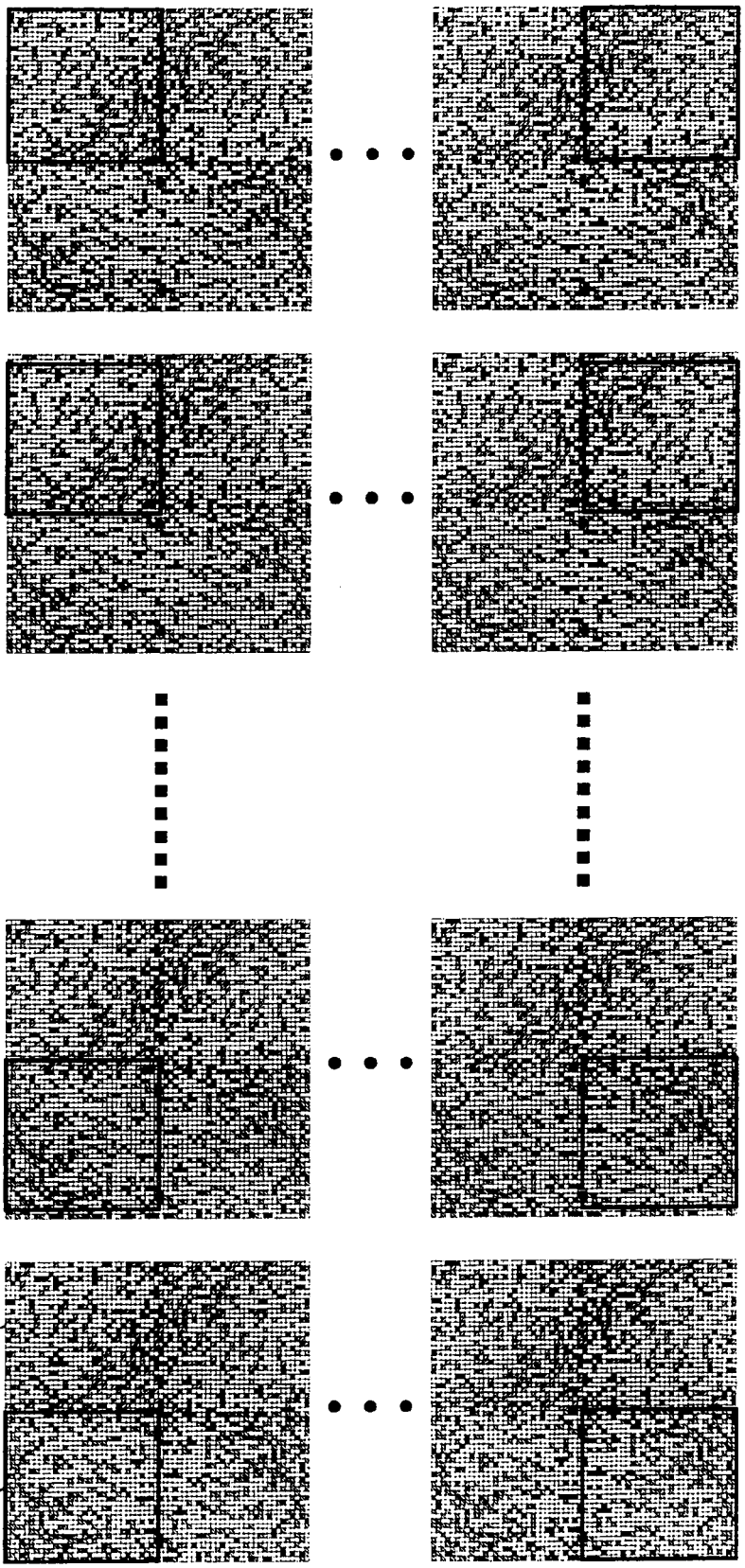
FIG. 2 is an image view explaining the calculation of the correlation value of the reference image to the cross-checking image in the same experiment.
Figure 6:
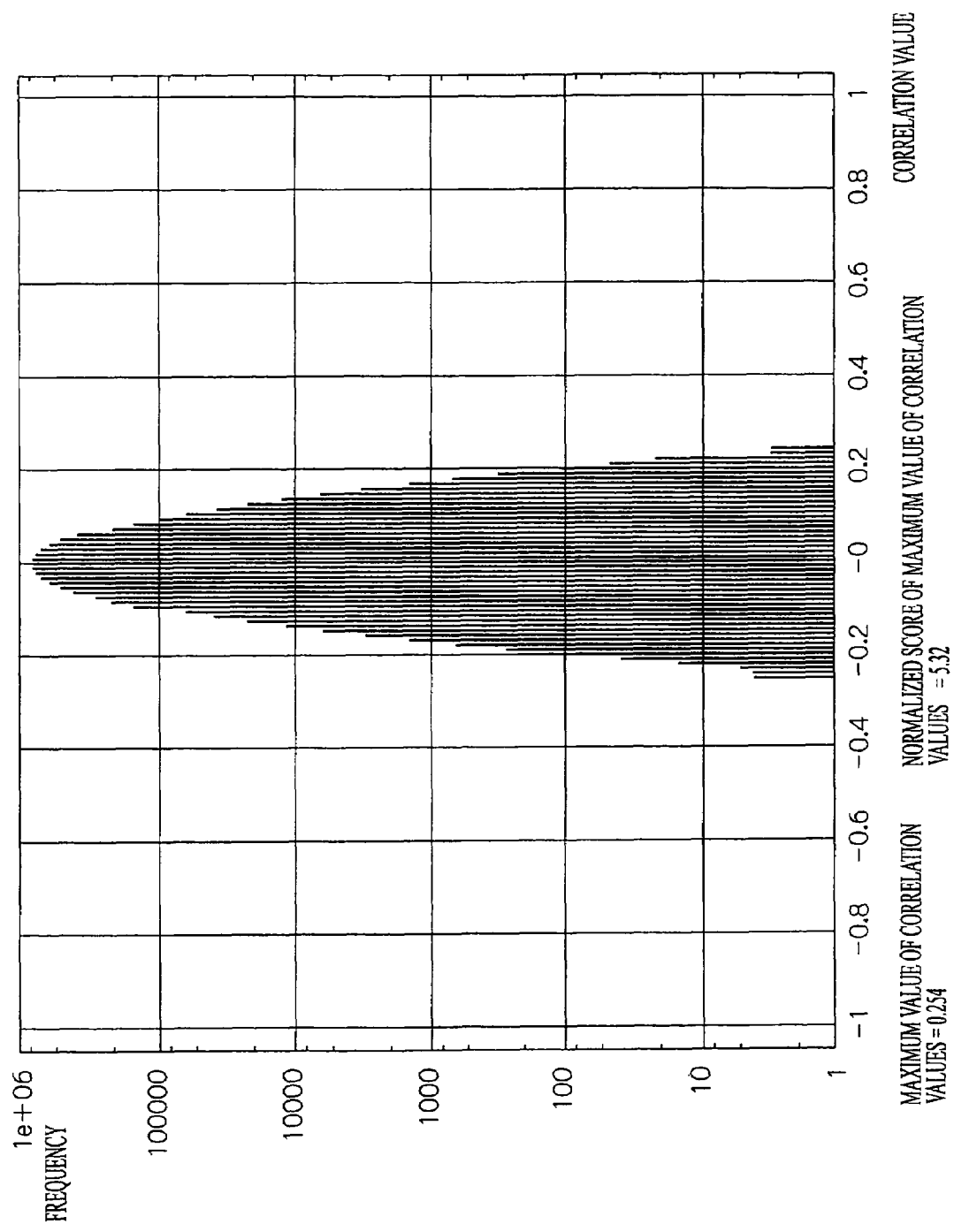
FIG. 6 is a diagram showing distribution of correlation values in a third example of comparisons.
Figure 7:
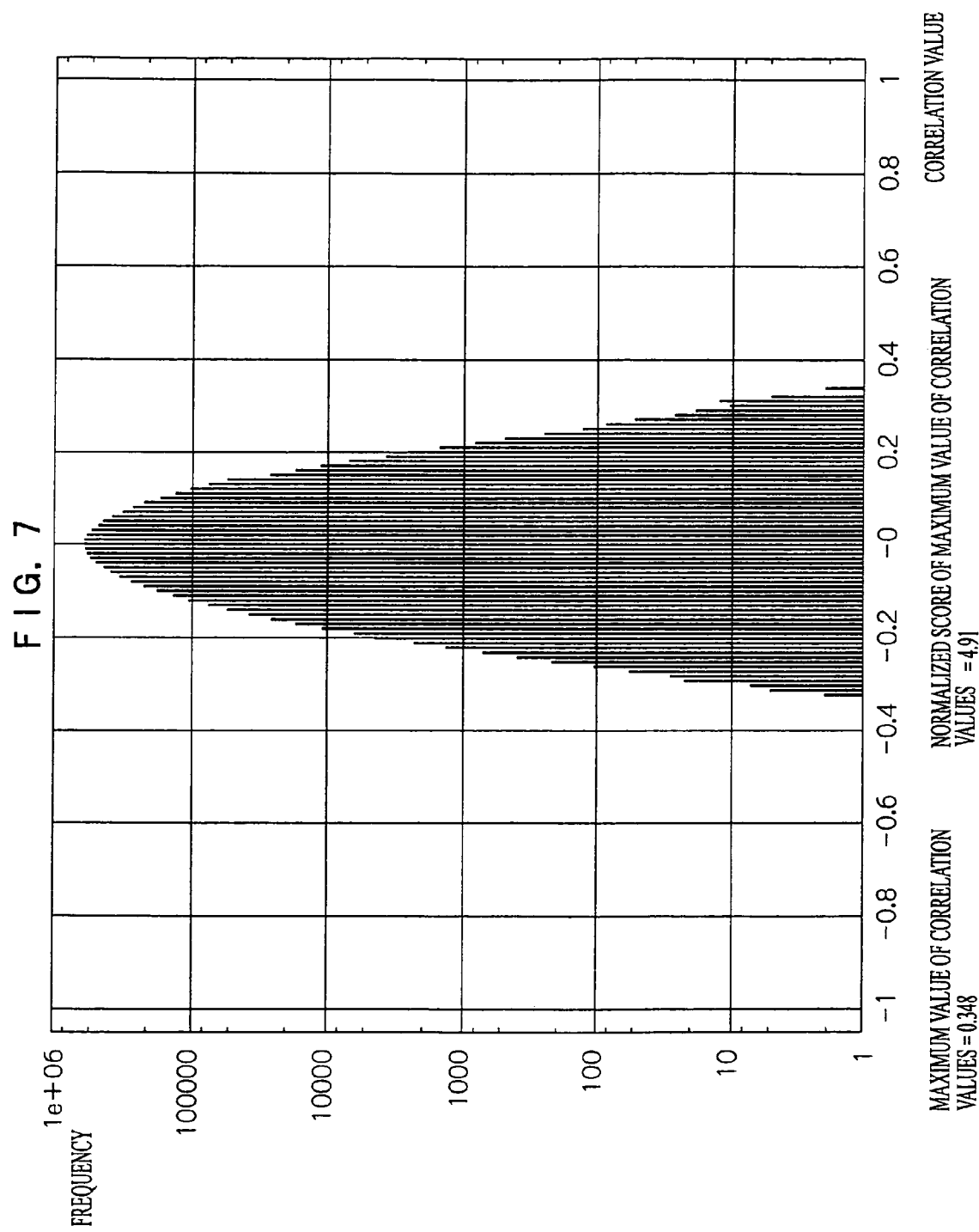
FIG. 7 is a diagram showing distribution of correlation values in the experiment in a case with a high probability of determining a fake object to be genuine.
Figure 8:
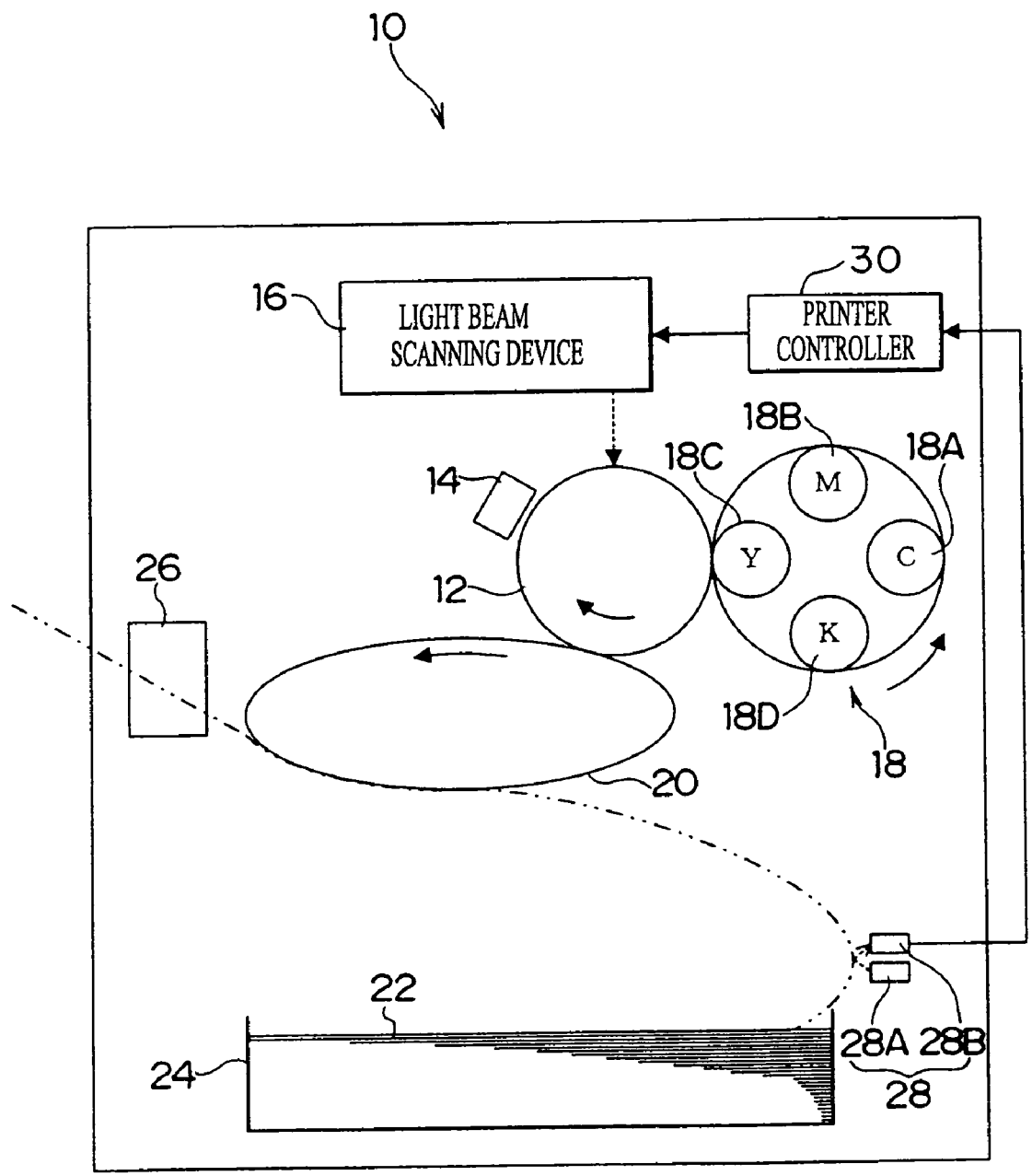
FIG. 8 is a schematic block diagram of a color printer in an embodiment.

An embodiment of the present invention is specifically described below while referring to the accompanying drawings. FIG. 8 shows a color printer 10 relating to the embodiment. The color printer 10 has a photosensitive drum 12 as an image carrier. The photosensitive drum 12 is charged by a charger 14. On the photosensitive drum 12, a light beam scanning device 16 is disposed for emitting a deflected light beam along the main scanning direction (the direction parallel to the axis of the photosensitive drum 12), being modulated depending on the image to be formed. The light beam emitted from the light beam scanning device 16 scans on the peripheral surface of the photosensitive drum 12 in the main scanning direction, and sub-scans as the photosensitive drum 12 is rotated at the same time, and an electrostatic latent image is formed on the peripheral surface of the photosensitive drum 12.

A multi-color developer 18 is disposed at the right side of the photosensitive drum 12 in FIG. 8. The multi-color developer 18 comprises developers 18A to 18D containing toners of C (cyan), M (magenta), Y (yellow), and K (black) colors, and the electrostatic latent image formed on the photosensitive drum 12 is developed in any of the colors C, M, Y, K. In the color printer 10, a full-color image is formed by repeating the process of forming electrostatic latent images in a particular region and developing in mutually different colors plural times, and sequentially overlaying color toner images on the region.

An endless transfer belt 20 is disposed near the photosensitive drum 12, and a paper tray 24 containing recording sheets 22 is disposed beneath the location of the transfer belt 20. The peripheral surface of transfer belt 20 contacts with the peripheral surface of photosensitive drum 12, at the downstream side from the developing position of the multi-color developer 18 in the rotating direction of photosensitive drum 12, and toner images formed on the photosensitive drum 12 are temporarily transferred onto the transfer belt 20, and then transferred again, onto the recording sheet 22 drawn out from the paper tray 24 and conveyed up to the location of the transfer belt 20. A fixer 26 is disposed at a midway position of the conveying route of the recording sheet 22 leading to outside of the machine body of the color printer 10, and the recording sheet 22 on which toner images are transferred is sent into the fixer 26 for fixing the toner images, and is discharged from the color printer 10.

A reader 28 is also disposed at a midway position of the conveying route of recording sheet 22 from the paper tray 24 to the location of transfer belt 20 (indicated by the dotted line in FIG. 8). The reader 28 comprises a transmitter 28A for emitting light to the recording sheet 22, and a receiver 28B for receiving light emitted from the transmitter 28A and reflected by the recording sheet 22, and also includes a signal processing circuit (not shown) for converting the signal issued from the receiver 28B into digital data and outputting. Therefore, this reader 28 can read random changes of light reflectivity distributed along the surface of recording sheet 22 due to randomness of texture of fibrous matter forming the recording sheet 22, at a specified resolution (for example, 400 dpi) and a specified gradation (for example, 8-bit gray scale).

A printer controller 30 is connected to the light beam scanning device 16. An operation unit (not shown) including keyboard and display, and the reader 28 are connected to the print controller 30, and further a personal computer (not shown) for entering data to be printed on the recording sheet 22 is also connected, either directly or through a network such as a LAN. The printer controller 30 includes a microcomputer, and controls the operation of parts of the color printer 10 including the light beam scanning device 16.

Figure 9:
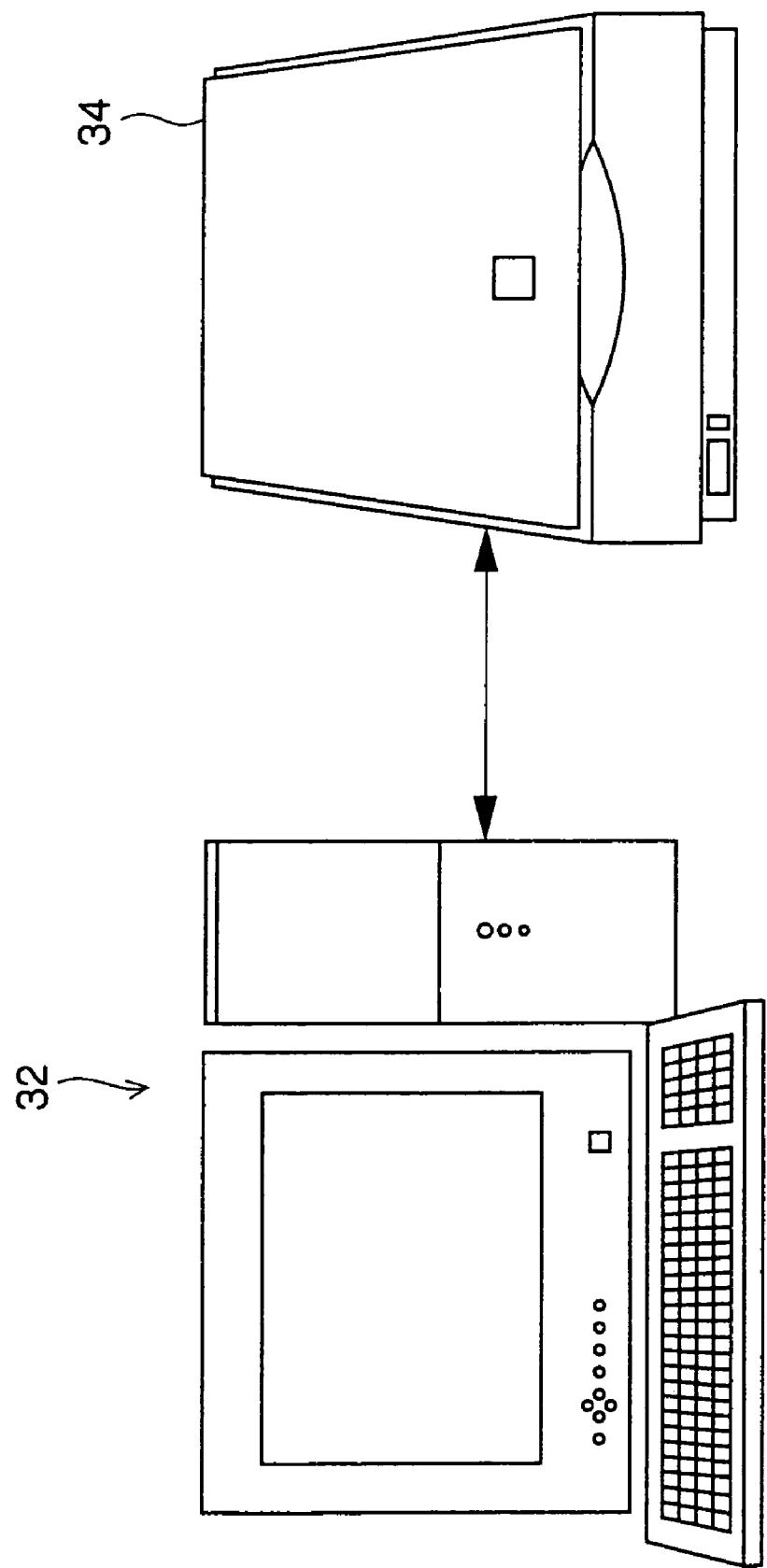
FIG. 9 is an external view of a PC and scanner functioning as the authenticity determination apparatus.

FIG. 9 shows a personal computer (PC) 32 and a scanner 34 functioning as an authenticity determination apparatus of the invention. Although not shown in the drawing, the PC 32 includes a CPU, ROM, RAM, and input and output ports, and they are mutually connected by way of a bus. Display, keyboard, mouse, and hard disk drive (HDD) are connected to the input and output ports. The HDD stores OS and various programs for application software, and also stores authenticity determination programs for the authenticity determination process described below.

On the other hand, the scanner 34 is a flat bed type, and has a function of reading the original placed on the original platen (not shown) at the same resolution (for example, 400 dpi) and same gradation (for example, 8-bit gray scale) as in the reader 28. The scanner 34 is connected to the input and output ports of the PC 32, and reading of the original by the scanner 34 is controlled by the PC 32, and the image data obtained by reading the original by the scanner 34 is put into the PC 32.

Next, the operation of the embodiment will be explained, starting with the processing by the color printer 10. If the document to be printed on the recording sheet is an original, then the color printer 10 of the embodiment has a function of printing as an original (printing the reference data used in document authenticity determination on the recording sheet 22). When printing by using the color printer 10, the user transmits the print data expressing the document to be printed on the recording sheet 22 from the PC to the color printer 10, and, when the document to be printed as the document used as the original, instructs the color printer 10 to print the document to be printed as an original.

Figure 10:
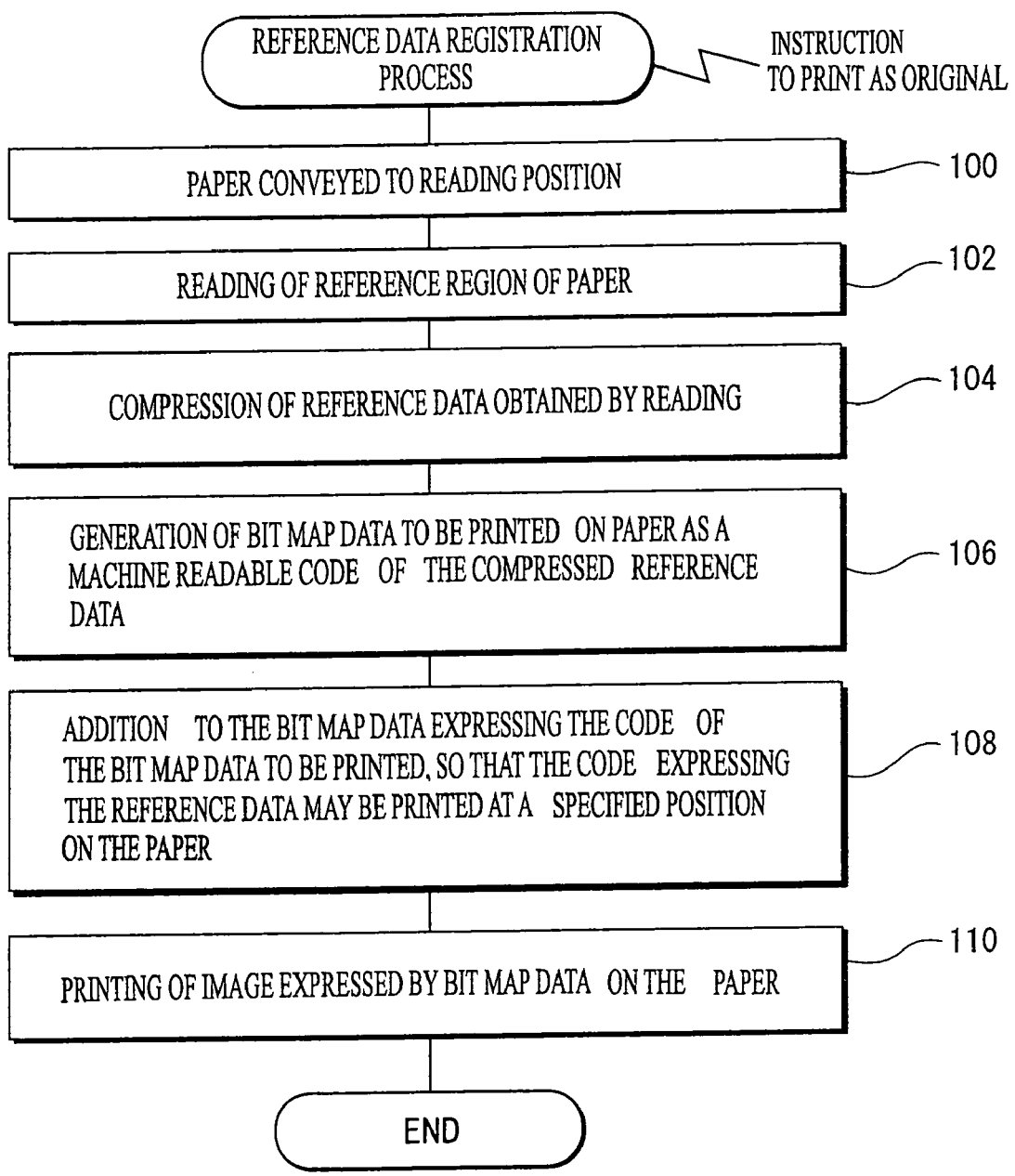
FIG. 10 is a flowchart of the operation of reference data registration process executed by a color printer.

When this instruction is given, the printer controller of the color printer 10 processes reference data registration. This reference data registration process is explained below by referring to the flowchart in FIG. 10. At step 100, the recording sheet 22 for printing document as original is drawn out from the paper tray 24, and conveyed to the location of the reader 28 (reading position). When the recording sheet 22 reaches the reading position, at next step 102, a specified reference region (a region in a size of 32×32 dots, or about 2 mm×about 2 mm) on the recording sheet 22 is read by the reader 28 at specified resolution (for example, 400 dpi) and specified gradation (for example, 8-bit gray scale).

As a result, the reader 28 outputs reference data showing random changes of transparency of paper in the reference region of the recording sheet 22 to be read, owing to randomness of texture of fibrous material composing the recording sheet 22 to be read. In this embodiment, the reading resolution is 400 dpi, the reading gradation is 8-bit gray scale, and the reference region to be read is 32×32 dots, and hence the size of reference data is 1024 bytes, and gradation value (lightness value) of each pixel (dot) is an integer value in a range of 0 to 255. On the basis of the reference data obtained by this reading, a visualized example of reference data (correcting the contrast for the ease of visible recognition) is shown in FIG. 11.

The reference region may be an arbitrary position on the recording sheet 22, and either the position of the reference region on a recording sheet 22 may be fixed, or the position of the reference region on recording sheet 22 may be varied depending on the document. However, if toner (or ink) is adhered in the reference region on the recording sheet 22 by printing after reading the reference region, the maximum value of correlation values calculated in the authenticity determination process mentioned below is substantially lowered, and the possibility of mis-determination is very high. Accordingly, when using a fixed position reference region, a position which cannot be adhered to by toner should be selected in the recording sheet 22 (for example, a position corresponding to an area outside of the printing range of the color printer 10), and when a variable position reference region depending on the document, a region not to be adhered to by toner or the like in printing should be determined in the recording sheet 22 on the basis of the print data, and it is desired to set the reference region within in the determined range. In particular, in the authenticity determination process described below, since a region wider than the reference region (for example, a region of 64×64 dots) is read as a cross-check region, the reference region is preferred to be a region free from adherence by toner in printing also in a surrounding region thereof.

Reading of the reference region may be also executed after printing on the recording sheet 22. In this case, if a portion adhered to with toner and the like in printing of the recording sheet 22 is included in the reference region, as mentioned above, as compared with a case of adherence of toner in the reference region on the recording sheet 22 by printing executed after reading of the reference region, the possibility of error in authenticity determination is lower. However, changes of transparency in the toner adhered portion on the paper are not random (changes peculiar to each paper), and if a portion not random in changes in transparency is set as the reference region, and the reference data obtained by reading the reference region is used in authenticity determination, resistance to forgery is low, and therefore if reading the reference region after printing on the recording sheet 22, it is preferred to set the reference region in a range not adhered to with toner on the paper.

When reading the reference region after printing on the recording sheet 22, a range not adhered to with toner on the recording sheet 22 can be judged by making use of the print data as mentioned above. However, since the portions adhered to with toner on the recording sheet 22 obviously have greater contrast as compare with portions not adhered to with toner, instead of making use of print data as mentioned above, by reading the recording sheet 22, and determining the contrast (difference of maximum value and minimum value of gradation value (lightness value or concentration value)) in each portion on the recording sheet 22 on the basis of the data obtained by reading, it is also possible to determine the range not stained with toner on the recording sheet 22.

Generally, as the size of the reading region (specifically the region for calculating the correlation value in authenticity determination) increases, the precision of authenticity determination is improved (at least one of FAR and FRR is lowered). But on the other hand, since a wider area is needed in the recording sheet 22 for a range not adhered to with toner by printing, the degree of freedom of printing is lowered, and the authenticity determination process is made more complicated. In this embodiment, the size of the reference region at reading resolution of 400 dpi is 32×32 dots (about 2 mm×about 2 mm). As is clear from the experiment results disclosed below, when the reference region is set smaller than this size, the precision of authenticity determination is lowered, but if the reference region is set larger than this size, the degree of improvement of determination precision is only slight. Therefore, in reading, an expensive and complicated microscope is not needed, and it is practical to use a simple reading device capable of reading at resolution of about 400 dpi (such as the reader 28 incorporated in the color printer 10 or any commercial scanner).

Further, in the reading of the reference region, if the output signal of receiver 28B is saturated by incidence of excessive quantity of light into the receiver 28B, changes of transparency in reference region indicated by reference data obtained by reading may be partially obscured, and reference data correctly expressing changes in transparency in the reference region cannot be obtained, and hence it is desired to suppress exposure appropriately when reading the reference region. Instead of using the reader 28 of the color printer 10, when reading by using scanner having reading modes of a photography mode and a document mode, it is preferred to read by selecting a reading mode (for example, photography mode) capable of reading transparency changes of paper at high definition.

When the reference region is read as mentioned above, at step 104, the reference data obtained by reading is compressed by applying a discrete cosine transform or the like, and at next step 106, on the basis of the compressed data, bit map data for printingonto a recording sheet (original) 22 is generated as code in a format to be automatically read by machine (for example, two-dimensional barcode). Data compression at step 104 is not essential, and data may be coded without being compressed. When changing the position of reference region depending on the document, preferably, information showing the position of reference region is added to the reference data obtained by reading, and then the data should be compressed and coded. Data may be also encrypted.

At the next step 108, in order that the code expressing the reference data may be printed at a specific position of recording sheet (original) 22, the bit map data generated at step 106 is added to the bit map data to be printed (obtained by developing the print data received in the color printer 10 from the PC into bit map data). At step 110, when printing on the recording sheet (original) 22, the bit map data is issued to the light beam scanning device 16. As a result, the document desired to be printed as an original by the user is recorded in the recording sheet (original) 22 in a state where code expressing the reference data is added to a specific position.

For a recording sheet 22 on which the document is printed as an original, when the region being read as reference region is adhered to by ink or dirt or the like, the precision of determination of the authenticity determination explained below may be lowered. Therefore, when printing the document as an original, for example, the user is advised to be cautious to ensure dirt or the like does not adhere to the reference region when printing marks indicating the region being read as the reference region or the like. On the other hand, giving no indication of the region being read as the reference region is effective for preventing forgery, and so the region may, intentionally, not be indicated for the purpose of preventing forgery.

If a region being read as reference region is adhered to by dirt or the like, in order to avoid lowering of the precision of authenticity determination, plural reference regions may be set, and individual reference regions are each read in, and plural reference data obtained by reading may be stored individually. As a result, if part of a plural region being read as a reference region is adhered to by dirt or the like, this region may be excluded, and authenticity can be judged by using other clean regions, and lowering of the precision of authenticity determination can be avoided.

Then, when determining the authenticity of paper (document) having a code printed at a specified position, an authenticity determination process is executed by the PC 32, which is explained by referring to the flowchart in FIG. 12. When execution of the authenticity determination process is instructed by the user desiring to confirm whether a document is genuine or fake, the authenticity determination program is read out from the HDD of the PC 32, and the obtained authenticity determination program is executed by the CPU of the PC 32.

At step 120, the display shows a message requesting the document to be judged for authenticity to be placed on the scanner 34 (put on the original platen), and the document is set in the scanner 34. At step 122, determination of whether setting of the document is complete or not is carried out, and step 122 is repeated until judged affirmatively. When the document is set in the scanner 34, it is affirmatively determined at step 122, the process moves to step 124, and the scanner 34 is instructed to read the document placed on the original platen.

As a result, the whole area of the document to be judged is read by the scanner 34 at same resolution (400 dpi) and same gradation (8-bit gray scale) as reading of the reference region, and the image data obtained by the reading is fed into the PC 32 from the scanner 34. Also it is preferred to control the exposure appropriately in this reading so as to obtain image data accurately expressing transparency changes of the document to be judged, especially in the cross-check region. If the scanner 34 has reading modes, such as a photography mode and a document mode, it is preferred to read by selecting a reading mode (for example, photography mode) capable of reading transparency changes of paper at high definition.

When image data is entered from the scanner 34, at next step 126, out of the entered image data, data of the region printed with the code expressing the reference data is extracted. At step 128, on the basis of the data extracted at step 126, the data expressed by the code printed in the document to be judged is identified, and the recognized data is expanded (decoded if encrypted) and the like, and the reference data is restored.

At next step 130, from the image data entered from the scanner 34, data is extracted from the cross-check region, of which the central position thereof coincides with the central position of the reference region, and being wider (64×64 dots) than the reference region (therefore, this cross-check region includes the reference region). When varying the position of the reference region depending on the document, the position of the reference region can be confirmed, for example, on the basis of the information showing the position of reference region added to the reference data.

Instead of confirming the position of reference region on the basis of the information added to the reference data, a certain mark may be printed near the reference region at the time of printing, and after reading for authenticity determination, the mark can be searched for in the image data obtained by reading, and the position of the reference region may be recognized automatically. As a result, if the document to be judged placed on the original platen is slightly deviated in position at the time of reading for authenticity determination, the position of reference region can be recognized correctly without being affected by the position deviation.

Such mark may be, for example, a spot. Or if plural marks are printed without overlapping with each other (the number of marks should preferably be small, and most appropriately two), if the relationship between positions of individual marks and reference position are known, the position and orientation (angle) of the reference position can be identified from the positions of the plurality of marks. The marks can be detected as described below.

That is, as a result of searching for a mark on the image data, if one mark is detected, then detection is determined to be a failure, or the paper is determined as not having a reference region to be read (the document is not printed as an original). When two marks are detected, the Euclidean distance between the two marks is determined, and if it is within an allowable range, then they are determined to be marks indicating a reference region, and if outside of the allowable range, it is determined that detection is a failure. When three or more marks are detected, the Euclidean distance between individual marks is determined, and if there is one set of marks of which the distance is within the allowable range, this pair is determined to be marks indicating the reference region. If the set of marks of which distance is within the allowable range is 0 or 2 or more, it may be determined that detection is a failure, or the set for which the distance is closest to the allowable range may be temporarily picked up as candidates. In the invention, since the FAR can be suppressed to a very low level by appropriately selection of the threshold level for authenticity determination, even if spots not actually showing the reference region are falsely determined to be marks showing a reference region, there is virtually no adverse effect on the authenticity determination precision, although the processing time may be increased.

In the authenticity determination process of the embodiment, from the data in the cross-check region, data corresponding to the region (the region to be calculated: corresponding to the second region of the invention) of the same size as the reference region (corresponding to the first region of the invention) is extracted, and the correlation value of this data and reference data is calculated, and this computation is repeated while changing the position of the region to be calculated. Accordingly, at next step 132, the data pickup position in the cross-check region (the position of the region to be calculated) is initialized.

At step 134, from the data in the cross-check region, data of the region (cross-checking data) of the same size as the reference region positioned at the set data pickup position is extracted. At step 136, according to formula (1), the correlation value of the reference data restored at step 128 and the cross-checking data extracted at step 134 is calculated by the normalized correlation method, and the correlation value obtained by this computation is stored in RAM or the like.

At next step 138, it is determined whether the region to be calculated has scanned the whole area of the cross-check region or not. If determined in the negative, going to step 140, the data pickup position is moved vertically or laterally by one dot only, and the process returns to step 134. Thus, the operation of steps 134 to 140 is repeated until determined in the affirmative at steep 138. In this embodiment, since the reference region is 32×32 dots and the cross-check region is 64×64 dots, calculation of correlation values is carried out (64−32+1)×(64−32+1)=1089 times, and 1089 correlation values are obtained.

When computation of correlation values is over, it is determined in the affirmative at step 138, and the process proceeds to step 142, and the maximum value is extracted from the multiple correlation values obtained by this computation. At next step 144, the standard deviation and mean of the multiple correlation values are calculated, and the calculated standard deviation and mean, and the maximum value of correlation values obtained at step 142 are put into formula (2), and the normalized score of the maximum value of correlation values is calculated.

At step 146, it is judged if the maximum value of correlation values obtained at step 142 is more than a threshold or not, and if the normalized score calculated at step 144 is more than a threshold or not. The threshold of maximum value of correlation values is, for example, 0.3, and the threshold of normalized score is, for example, 5.0. If determined in the affirmative at step 146, the process goes to step 148, and the determination result is output by a message showing that the document is genuine being displayed on the display or other method, and the authenticity determination process is terminated. If determined in the negative at step 146, the process goes to step 150, and the determination result is output by a message showing that the document is fake being shown on the display, and the authenticity determination process is terminated. Thus, the authenticity of the document (paper) can be determined at high precision in a simple process.

In this authenticity determination process, when plural reference regions are set, individual regions are computed at steps 130 to 150. Plural reference regions may include an area adhered to with ink or the like, and in the data obtained by reading the cross-check regions corresponding to individual reference regions, maximum value and minimum value of gradation values of each pixel are determined, and if the difference of maximum value and minimum value of gradation values is more than a predetermined threshold, or more than a threshold dynamically calculated from the data obtained by reading, a warning may be given, or authenticity may be judged by excluding the corresponding reference region and cross-check region.

Figure 13:
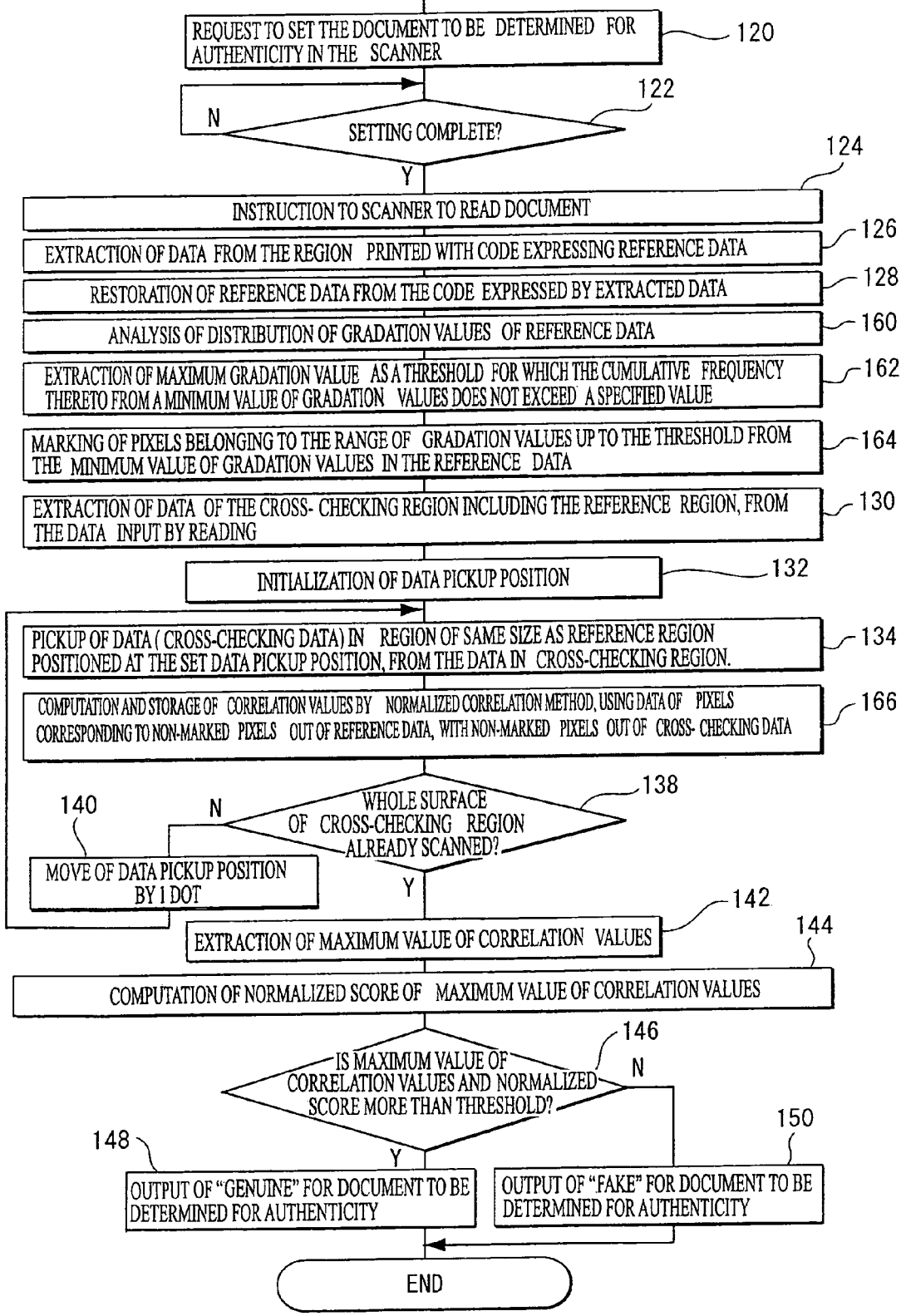
FIG. 13 is a flowchart of an operation of other example of an authenticity determination process.

The above explanation is about an example of calculating correlation values by using the data of all pixels in the regions to be calculated extracted from the reference region and cross-check region of the recording sheet 22 on which the document is printed as original, but the invention is not limited to such an example. Considering a possibility of the presence of varying density portions due to adherence with ink (or toner) or dirt in the region being read out as a reference region, as shown in FIG. 13, on the basis of the distribution of gradation values of reference data, a gradation value range estimated to include noise portions corresponding to the above varying density portions may be set, and data of pixels belonging to this set gradation value range is excluded from the reference data, and then the correlation values may be calculated.

In the authenticity determination process shown in FIG. 13, only the portions different from the authenticity determination process shown in FIG. 12 will be explained. In the authenticity determination process in FIG. 13, the reference data restored at step 128 is used at next step 160, and a histogram of gradation values is plotted, and distribution of gradation values of reference data is analyzed. To plot a histogram of gradation values, for example, plural gradation value ranges are set, data of single pixels is picked up from reference data, and it is judged if the gradation value of this pixel belongs to any one of the plural set gradation value ranges or not, and the count value of the pixels corresponding to the gradation value range to which the pixel is determined to belong to is incremented by 1, and this operation is repeated for all pixels of the reference data.

An example of distribution of gradation values generated by this process is shown in Table 1.

TABLE 1

| Range of gradation values (lightness values) | Number of pixels | Cumulative frequency from minimum value of gradation values | Cumulative frequency from maximum value of gradation values |
| --- | --- | --- | --- |
| 0~20 | 8 | 0.0488% | 100% |
| 20~71 | 1 | 0.0549% | 100% |
| 71~102 | 1 | 0.061% | 99.9% |
| 102~117 | 2 | 0.0732% | 99.9% |
| 117~122 | 1 | 0.0793% | 99.9% |
| 122~127 | 1 | 0.0854% | 99.9% |
| 127~132 | 2 | 0.0977% | 99.9% |
| 132~147 | 2 | 0.11% | 99.9% |
| 147~153 | 1 | 0.116% | 99.9% |
| 153~158 | 1 | 0.122% | 99.9% |
| 158~163 | 2 | 0.134% | 99.9% |
| 163~168 | 4 | 0.159% | 99.9% |
| 168~173 | 9 | 0.214% | 99.8% |
| 173~178 | 29 | 0.391% | 99.8% |
| 178~183 | 71 | 0.824% | 99.6% |
| 183~188 | 191 | 1.99% | 99.2% |
| 188~193 | 437 | 4.66% | 98% |
| 193~198 | 918 | 10.3% | 95.3% |
| 198~204 | 1687 | 20.6% | 89.7% |
| 204~209 | 2587 | 36.3% | 79.4% |
| 209~214 | 3277 | 56.3% | 63.7% |
| 214~219 | 2988 | 74.6% | 43.7% |
| 219~224 | 2351 | 88.9% | 25.4% |
| 224~229 | 1202 | 96.3% | 11.1% |
| 229~234 | 445 | 99% | 3.73% |
| 234~239 | 127 | 99.8% | 1.01% |
| 239~244 | 36 | 100% | 0.238% |
| 244~249 | 2 | 100% | 0.0183% |
| 249~255 | 1 | 100% | 0.0061% |

Mean = 209.2
Standard deviation = 11.2

Table 1 shows an example of results of counting the number of pixels in each gradation value range, by dividing the range of 0 to 255 gradation values (lightness values) expressed by data of 8 bits per pixel into 29 gradation value ranges.

At next step 162, on the basis of distribution of gradation values of reference data obtained at step 160, a gradation value threshold is extracted as a maximum value in a range of cumulative frequency from a minimum value of gradation values (lightness values) so as not to exceed a specified value in the reference data. For example, in the gradation value distribution in Table 1, if the specified value is 3%, gradation value=183 at which cumulative frequency from minimum value of gradation values is 1.99% is extracted as the gradation value threshold, and if the specified value is 5%, gradation value=188 at which cumulative frequency from minimum value of gradation values is 4.66% is extracted as the gradation value threshold. At step 164, out of the reference data, the data of pixels belonging to the gradation value range from the minimum value of gradation values to the gradation value threshold determined at step 162 is marked to be excluded from the calculating scope of correlation values. As a result, for example, in the gradation value distribution shown in Table 1, if the specified value is 3%, data of 326 pixels of gradation value≦183 is excluded from the calculating scope of correlation values, and if the specified value is 5%, data of 763 pixels of gradation value≦188 is excluded from the calculating scope of correlation values.

In the authenticity determination process in FIG. 13, instead of the mere calculation of correlation values as in the authenticity determination process in FIG. 12 (step 136), at step 166, by using only the data of non-marked pixels that have not been marked for exclusion from the scope for calculating the correlation values of the reference data, and the data of pixels corresponding to non-marked pixels out of the cross-checking data (the data in the region of same size as the reference region positioned at the set data pickup position off-taken from the data in the cross-check region), correlation values are calculated by the normalized correlation method, and correlation values obtained by computation are stored in RAM or the like. At step 166, correlation values are obtained by putting only the data of pixels within the scope for calculating correlation values into formula (1). More simply, the correlation values may be also calculated in formula (2), where the count of the pixels in the reference region which are determined to be non-marked pixels is n, the sum of the gradation values of the non-marked pixels is msum, the square of the sum of gradation values of non-marked pixels is msum2, the sum of gradation values of pixels corresponding to non-marked pixels of cross-checking data is tsum, the square of the sum of gradation values of pixels corresponding to non-marked pixels of cross-checking data is tsum2, and the sum of the products of gradation value 1um1 of non-marked pixels multiplied by the gradation value 1um2 of pixels of the cross-checking data corresponding to the non-marking pixels is mtsum.

$$\text{Correlation value} = \frac{n \cdot mtsum - msum \cdot tsum}{\sqrt{(n \cdot tsum2 - tsum \cdot tsum) \cdot (n \cdot msum2 - msum \cdot msum)}} \quad (2)$$

The above process of setting the gradation value range (gradation value range from minimum value of gradation values up to a gradation value threshold) estimated to include noise components, on the basis of the distribution of gradation values corresponding to the reference data, and by excluding the data of pixels (non-marked pixels) corresponding to the set gradation value range and data of pixels corresponding to the non-marked pixels in the cross-checking data, from the calculating of gradation values corresponds to the invention as set forth in claim 6 (and claim 7). As a result, in the recording sheet 22 on which a document is printed as an original, even if there is a varying density portion due to adherence with ink (or toner) or dirt in the region being read as the reference region, since a similar varying density portion is present in the cross-check region of a "fake" document to be judged, in spite of the document to be determined being "fake", the maximum value of correlation values and normalized score of maximum value of correlation values can be prevented from exceeding the threshold, and by doing so that the authenticity can be judged at high precision.

The distribution of the gradation value range of the noise components in reference data changes due to effects of fluctuations of lighting conditions or the like when reading the reference region, but in this case, since the maximum value of a gradation value threshold is extracted in a range of the cumulative frequency from a minimum value of gradation values (lightness values) in reference data so as not to exceed a specified value, and the data of pixels belong to the gradation value range from a minimum value of gradation value up to the gradation value threshold is excluded from the scope of calculating the correlation values, the effects of fluctuations of lighting conditions or the like when reading the reference region can be avoided, and a gradation value range estimated to include noise components can be appropriately determined, so that data corresponding to noise components can be precisely excluded from the scope of calculating correlation values.

Further, as mentioned above, the gradation value range estimated to include noise components is set, and the data belonging to the set gradation value range is excluded only from the reference data, but the invention is no limited to this example alone, and, for example, such data may be excluded from the cross-checking data alone, or from both reference data and cross-checking data. However, when the data belonging to the set gradation value range is excluded from the cross-checking data, every time after the position of the region to be calculated for extracting data as cross-checking data from the cross-check region is moved the same process as above must be carried out, and therefore it is preferred to set the gradation value range in the reference data and exclude the data belonging to the gradation value range in the reference data from the viewpoint of reducing the computation requirements. Setting of gradation value range in reference data, and exclusion of data belonging to the gradation value range may be conducted at the time of registration of the reference data, but is preferably conducted after reading out the registered reference data if there is a possibility that the registered reference data may be used for other purposes than authenticity determination.

In this case, the gradation value threshold is the maximum value of a gradation value threshold of cumulative frequency from a minimum value of gradation values (lightness values) so as not to exceed a specific value, but the invention is not limited to this, and it may be that a minimum value of a gradation value threshold of cumulative frequency from a maximum value of gradation values (lightness values) so as to exceed a specific value. Or the gradation value range excluded from the scope of calculating the correlation values may be the range of AVE−nσ or less, wherein the mean of gradation values is AVE, the standard deviation of distribution of gradation values id σ, and a specified value is n (for example, 2). In the above cases, the gradation value range estimated to include noise components is set as a gradation value range from a minimum value of gradation values up to a gradation value threshold, but the invention is not limited to such examples. If the background of recording paper 22 printing the document is black, the gradation value range estimated to include noise components may be specified as a gradation value range from the maximum value of gradation values down to a gradation value threshold (for example, gradation value (lightness value) minimum, a gradation value threshold of cumulative frequency from a maximum value of gradation values (lightness values) so as not to exceed a specified value (or maximum exceeding a specified value), or AVE+nσ wherein the mean of gradation values is AVE, the standard deviation of distribution of gradation values is σ, and a specific value is n).

In this example, the reference region and cross-check region are rectangular (square to be specific), but the invention is not limited to this shape, but an arbitrary shape may be selected from, for example, a quadrangle, trapezoid, triangle, circle, ellipse, straight line (for example, a very flat rectangle in width of 1 to several dots). The regions are not required to be connected, but may be discrete regions. However, since a complicated shape of regions does not contribute to enhancement of the precision of authenticity determination, a simple rectangular or circular shape is preferred for a reference region and cross-check region except for special cases where printing is undertaken in the majority of the area on the paper or the like.

Generally, paper forms of documents and securities are rectangular, and when the reference region and cross-check region are set as rectangular shapes, merely by setting an arbitrary side of the region parallel to an arbitrary side of the paper, all sides of the paper and region are either parallel or at right angles to each other, and therefore, at the time of registering the reference data, by setting the reference region so that an arbitrary side of the reference region is parallel to an arbitrary side of the paper, and when determining the authenticity, by setting the cross-check region so that an arbitrary side of the cross-check region is parallel to an arbitrary side of the paper, the need for rotation of the cross-check region relative to the reference region can be avoided, and the precision of authenticity determination can be enhanced.

When the reference region and cross-check region are circular, if the center of the cross-check region can be aligned with the center of the reference region by some method or other, by converting locations into a system of polar coordinates, the same processing as in the case of a rectangular shape can be applied. Generally, however, scanners are designed to read two-dimensionally by moving the line sensor and the original relatively in the sub-scanning direction (direction orthogonal to sensor array of line sensor), and the output sequence of data from the scanner is a sequence appropriate for off-taking data in a rectangular region, and hence there is little merit of forming the reference region and cross-check region in a circular shape, and the alignment process of the centers of the two regions is not easy, and, practically, it is appropriate to form the reference region and cross-check region as rectangular shapes.

Further, if the random characteristic intrinsic to the solid object to be determined for authenticity is a characteristic accompanied by color changes, when reading the feature of the solid optically, it is effective to read by separating into plural color components, but when random changes of transparency of paper due to randomness of texture of fibrous material forming the paper are used as the intrinsic feature of paper as a solid object, color information is not necessary, and it is sufficient to read using a gray scale of a single color as in this embodiment. A resolution of gradation in reading at 256 gradations (8 bits) is enough when the object of reading is paper, and even if the gradation resolution in reading is further increased, the authenticity determination precision is not enhanced by much.

By using an inexpensive commercial scanner, gradation resolution of at least 8 bits is possible, but if for some reason or other a reduction of number of bits is demanded then, for example, instead of assignment of bits uniformly (linearly) according to the change of gradation values from shadow to highlight, by assigning more bits to the distribution within the bright range (lightness range closer to highlight) of changes of gradation values corresponding to random changes of transparency of paper, even if the number of bits assigned for gradation values is 6 bits or 4 bits, the same authenticity determination precision can be obtained as in a case of assigning bits uniformly according to gradation changes setting the number of bits of gradation values at 8 bits. Or, irreversible compression, such as JEPG may be applied to data obtained by reading.

As mentioned above, reference data is encoded, and recorded on the paper (original), but the invention is not limited to such examples, and reference data may be registered in the database connected to the PC 32 for determining the authenticity by way of a network. In this case, by recording information for identifying the corresponding reference data registered in the database on the paper (original), the corresponding reference data can be easily acquired from the database through the network on the basis of this information.

As mentioned above, the size of the cross-check region is larger than the size of the reference region, but the invention is not limited to this, and the size of the reference region may be set larger than the size of the cross-check region (in this case, the cross-check region corresponds to the first region of the invention), and the correlation value of a partial region (corresponding to the second region of the invention) of the same size as the cross-check region in the reference region with the cross-check region is calculated, and this operation may be repeated by deviating the position of the partial region in reference region to determine authenticity. In this case, it is a demerit that the volume of reference data increases, and hence it is preferred to set the size of the cross-check region larger than the size of the reference region because storage capacity for storing the reference data can be saved.

Paper is used as the solid object in the invention in the examples explained above, but there are intrinsic characteristics of cards (random undulations not controlled by manufacture) distributed in the non-printing regions of the silver-colored reverse side of various prepaid cards such as highway cards and bus network cards, and the inventors have experimentally confirmed that these characteristics can be also applied in the authenticity determination process, and the invention can be also applied with such cards as the solid object. For example, counterfeit highway card can be judged by specifically reading the distribution of random undulations in a partial region (reference region) of the non-printed area of the reverse side of a card at the time of card manufacture, as the card intrinsic feature. An electronic signature is added to the reference data obtained by reading, and this is then recorded in the card as magnetic data, and when reading and writing the magnetic data in the card at the toll gate, a cross-check region wider than the reference region is optically read including the reference region on the reverse side of card, and correlation values of the cross-checking data obtained by reading and the reference data contained in the magnetic data being read out from the card are calculated, and the maximum value of correlation values and normalized score of maximum value of correlation values are compared with threshold values, and the authenticity of card can be determined.

EXAMPLE 1

To confirm the authenticity determination precision by applying the invention, the inventors have experimented as follows. In this experiment, from block of A4 size office paper containing 500 sheets (C2 paper product code V436 of Fuji Xerox Office Supply Co. Ltd.), 10 consecutive sheets are drawn out and used as samples.

<Experiment for confirming FRR>

Figure 14:
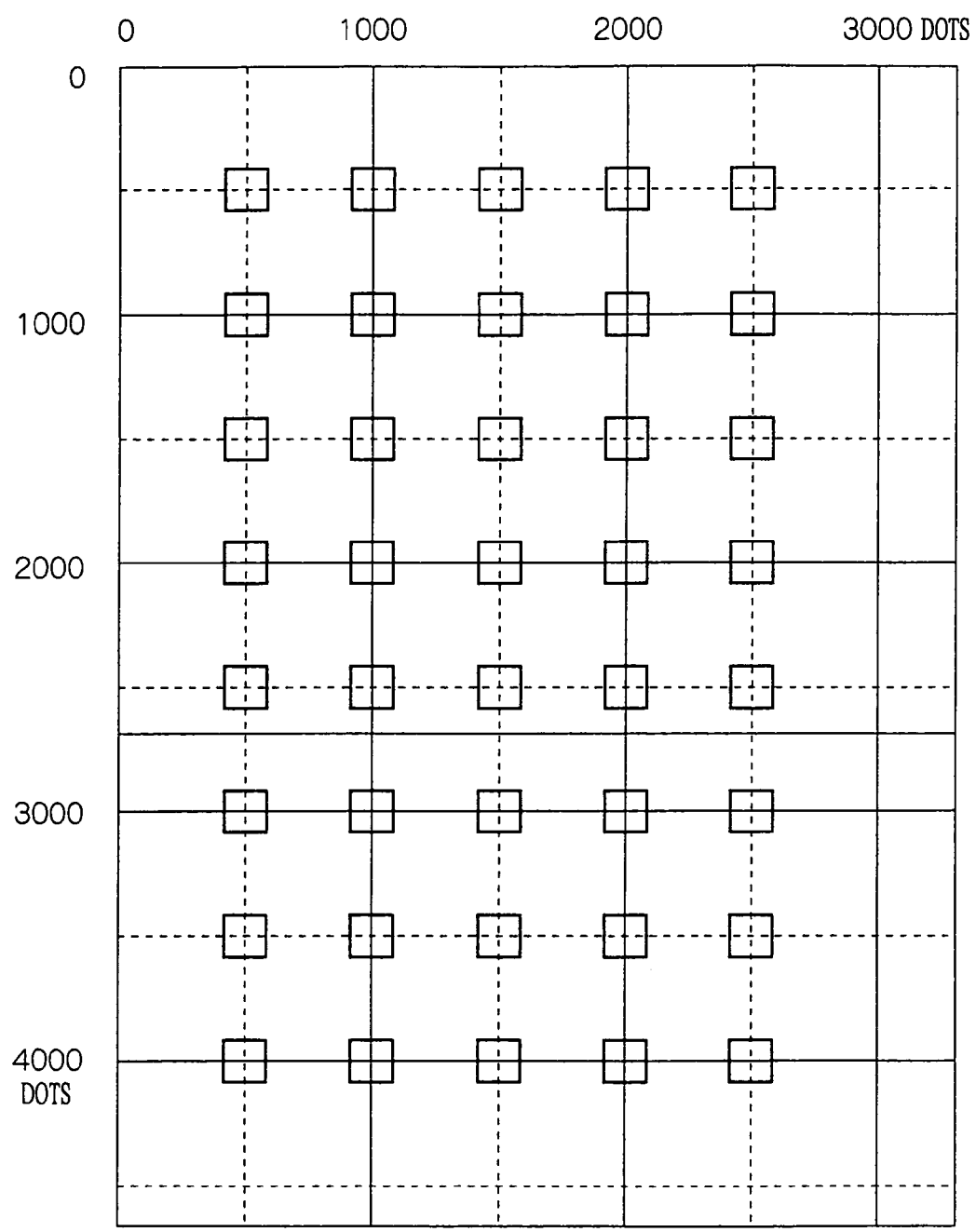
FIG. 14 is an image showing the positions of reading regions in the experiment for false rejection rate (FRR) checking.

In this experiment, in A4 size samples, 40 reading regions are set at approximately equal intervals over the whole surface (see FIG. 14). The longitudinal direction of the sample is the vertical direction, and the upper left corner when facing towards the reading side of each sample is the origin, and the center coordinates of individual reading regions are as follows by dot number conversion at 400 dpi.

(500, 500), (500, 1000), (500, 1500), (500, 2000), (500, 2500), (500, 3000), (500, 3500), (500, 4000), (1000, 500), (1000, 1000), (1000, 1500), (1000, 2000), (1000, 2500), (1000, 3000), (1000, 3500), (1000, 4000), (1500, 500), (1500, 1000), (1500, 1500), (1500, 2000), (1500, 2500), (1500, 3000), (1500, 3500), (1500, 4000), (2000, 500), (2000, 1000), (2000, 1500), (2000, 2000), (2000, 2500), (2000, 3000), (2000, 3500), (2000, 4000), (2500, 500), (2500, 1000), (2500, 1500), (2500, 2000), (2500, 2500), (2500, 3000), (2500, 3500), (2500, 4000)

Samples are read by using a FUJITSU fi-4010CU (flat bed type scanner), at a resolution of 400 dpi, and gradation of 8-bit gray scale.

The size of the reading regions is set at four types: 16×16 dots (about 1 mm×about 1 mm), 32×32 dots (about 2 mm×about 2 mm), 64×64 dots (about 4 mm×about 4 mm), and 128×128 dots (about 8 mm×about 8 mm). In the experiment, individual reading regions are utilized as both reference regions and cross-check regions, and the entire surface of the sample is read by the scanner in order to curtail the number of times of reading, and from the image data obtained by reading, data corresponding to individual regions (data to be used as data of reference regions and data of cross-check regions) is extracted and used in authenticity determination.

In order that the size of cross-check regions relative to reference regions may be 2 times or 4 times by the ratio of length of side, combinations of sizes of reference regions and cross-check regions are as shown in Table 2.

TABLE 2

| Reference region | Cross-check region |
| --- | --- |
| 16 × 16 dots | 32 × 32 dots |
|  | 64 × 64 dots |
| 32 × 32 dots | 64 × 64 dots |
|  | 128 × 128 dots |
| 64 × 64 dots | 128 × 128 dots |
|  | 256 × 256 dots |
| 128 × 128 dots | 256 × 256 dots |

Since the original platen of the scanner is slightly larger than A4 size, the sample is placed on the original plated in four different manners: abutting to the right upper corner as seen from above the original platen (ordinary method), abutting to left lower corner (sample position deviated by about 2 mm in longitudinal direction and about 10 mm in lateral direction as compared with ordinary method), shifting to right clockwise (rotating about 1 degree clockwise), shifting to left counterclockwise (rotating about 1 degree counterclockwise), and each sample is placed on the original platen in different manners and read in each state.

In the experiment, as the combinations of data of reference regions and data of cross-check regions used in authenticity determination, the data obtained by reading samples placed in different manners are combined and used in authenticity determination. For a certain placing manner, there are three types of placing manners that are different and can be used as a combination, and in a single combination among combinations of sizes of reference region and cross-check regions shown in Table 2, authenticity is determined 4×3=12 times for a single reading region of a single sample, and a single sample has 40 reading regions, and the number of samples is 10, and hence authenticity is determined 12×40×10=4800 times in each combination of sizes of reference region and cross-check region.

As mentioned above, as the data of reference regions and cross-check regions to be used in authenticity determination, in order to use combinations of data obtained by reading samples placed in different manners, when extracting data corresponding to a reading region from the image data, the position of reading region is corrected for so that the central position of the reference region and the central position of the cross-check region may be approximately matched.

That is, if the image data for extracting the data of reading image is the data obtained by reading by abutting the sample to upper right corner, the position of the reading region is not particularly corrected. In the case of abutting to left lower corner, on the basis of image data obtained by reading by the scanner, a position deviation amount of the edges of the sample is calculated, and the position of the reading region is corrected. In the case of shifting the position to the right clockwise and shifting to the left counterclockwise, the positions of the corners of the sample are detected on the basis of the image data, and on the basis of detected position of the corners, the actual position of the reading regions after rotating and moving the sample are calculated, and the position of the reading region to be extracted as data from the image data is corrected (the correction is for the central position only, and rotation distortion is not corrected).

To determine authenticity, as in the embodiment explained above, correlation values of partial regions of the same size as reference region in cross-check region with the reference region are calculated by the normalized correlation method, and this operation is repeated while moving the partial region by 1 dot at a time within the cross-check region, and (m−n+1)×(m−n+1) instances of correlation values are obtained (for a reference region consisting of m×m dots, and a cross-check region consisting of n×n dots), and the maximum value of correlation values and the normalized score of maximum value of correlation values are determined, and it is judged whether the maximum value of correlation values is 0.3 or more or not, and whether the normalized score of maximum value of correlation values is 5.0 or more or not.

Results of the experiment are shown in Table 3.

TABLE 3

| Reference region | Cross-check region | Number of times of operation | FRR |
| --- | --- | --- | --- |
| 16 × 16 dots | 32 × 32 dots | 4800 | 19.02% |
|  | 64 × 64 dots | 4800 | 0.6458% |
| 32 × 32 dots | 64 × 64 dots | 4800 | 0.1250% |
|  | 128 × 128 dots | 4800 | 0.0833% |
| 64 × 64 dots | 128 × 128 dots | 4800 | 0.0208% |
|  | 256 × 256 dots | 4800 | 0.0000% |
| 128 × 128 dots | 256 × 256 dots | 4800 | 3.8750% |

As is clear from Table 3, in the reading condition of resolution of 400 dpi, and gradation of 8-bit gray scale, supposing the size of reference region to be 32×32 dots and the size of the cross-check region to be 64×64 dots, it can be seen that the FRR is low enough so as not to be a problem practically. This reading condition is sufficiently realized by an inexpensive commercial scanner, and it is evident that expensive reading devices such as microscopes are not needed for reading.

As a result of analysis of the experiment by the inventors about cases of wrong determination (genuine objects judged to be false), errors tend to occur when the sample is rotated clockwise or counter clockwise. Therefore it seems possible to improve the FRR easily by detecting and correcting the rotation distortion, using care not to rotate the paper when placing the paper on the original platen of scanner, modifying the original platen of the scanner so as not to rotate the paper easily, and taking other rotation distortion preventive and reduction measures.

<Experiment for Checking FAR>

As in the FRR experiment, the whole surface of A4 sample is read at a resolution of 400 dpi and gradation of 8-bit gray scale, and from the obtained data, data corresponding to reference regions and data corresponding to cross-check regions are extracted. Since the FAR is a probability of determination a fake object to be genuine, in the experiment for checking FAR, all regions on sample can be used as cross-check regions. In this experiment, correlation values of the reference region with cross-check regions comprising the full A4 size except for the reference region are calculated, and when a fake object is identified from the maximum value of correlation values and normalized score of maximum value of correlation values, it is evident that a fake object is identified also in any arbitrary cross-check region on the same sample, and the cross-check regions are set within a region of 3307× 4676 dots by reading all reading regions of the scanner including the whole surface of the A4 sample at 400 dpi.

In this experiment, the number of sample sheets is 5, and four reading regions are set at approximately equal intervals over the whole surface in each sample. Central coordinates of individual reading regions are as follows by dot number conversion of 400 dpi: (500, 500), (500, 3500), (2500, 500), and (2500, 3500). Size of reference region is set to four types: 16×16 dots, 32×32 dots, 64×64 dots, and 128×128 dots.

In the four reference regions per sample, authenticity is determined against the whole surface of the other four samples, and one sample sheet is determined for authenticity in 4 positions×4 sheets=16 times. Since five samples are determined, the total number of times of determining the authenticity is 5×16=80 times. It might appear that the number of times is smaller as compared with the experiment for checking FRR, but as mentioned above, it only appears so because all reading regions of scanner including the whole surface of A4 sample are used as cross-check regions, and if the cross-check region were to be divided into smaller regions, then it would correspond to ten million times of authenticity determination.

Results of experiment are shown in Table 4.

TABLE 4

| Reference region | Number of times of operation | FAR |
| --- | --- | --- |
| 16 × 16 dots | 80 | 31.250% |
| 32 × 32 dots | 80 | 0.0000% |
| 64 × 64 dots | 80 | 0.0000% |
| 128 × 128 dots | 80 | 0.0000% |

As clear from Table 4, when the size of reference region is other than 16×16 dots, FAR is 0.0000%, and it is guaranteed that FAR is 0.0000% even if authenticity is determined by dividing the cross-check region into small regions of arbitrary size. On the other hand, if the reference region size is 16×16 dots, FAR is 31.250%, and it is not usable in practice. This is, however, the worst case value, and when the cross-check region is divided into small regions, it is possible that FAR may be improved, but in the experiment for checking FRR, when the size of the reference region is 16×16 dots, the precision of authenticity determination is lower when compared with the case of setting the size of the reference region larger than 16×16. Therefore, at a resolution of 400 dpi, it is clear that the lower limit of size of the reference region should be 32×32 dots.

EXAMPLE 2

Continuing, setting the gradation value range estimated to include noise components in the reference data, the data belonging to the set gradation value range is excluded from the calculating scope of correlation values, and the effect is confirmed by the following experiment by the inventors.

Figure 15:
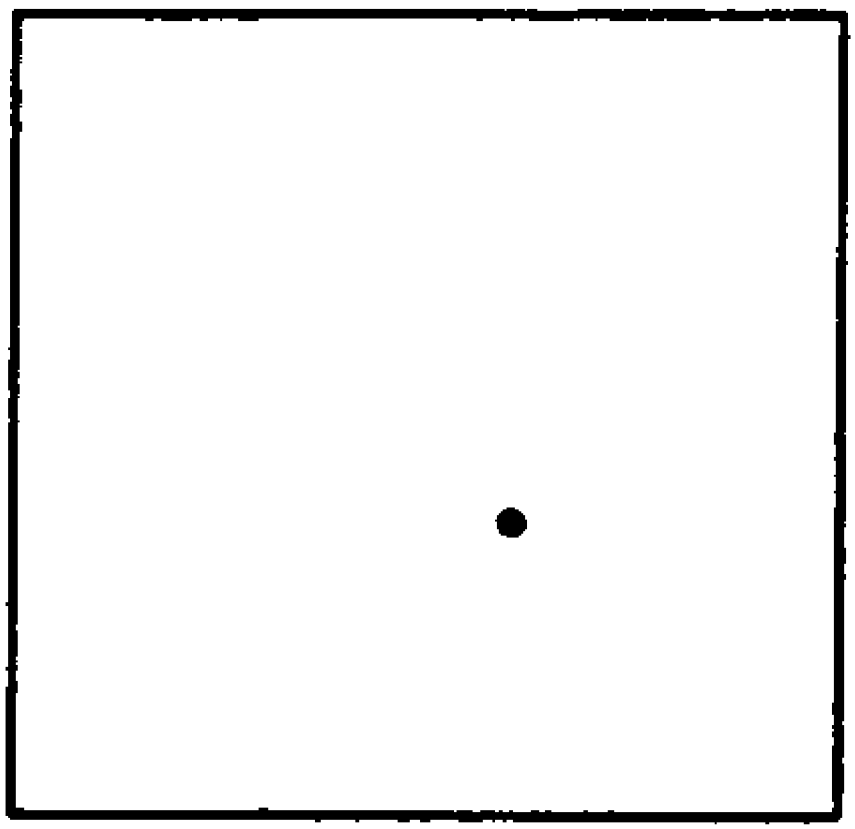
FIG. 15 is an image of an example of a reference region having black spot noise.

In this experiment, the same A4 paper as in example 1 is printed by a color copier (Docu Centre Color 400 of Fuji Xerox), and black spot noise corresponding to toner scattering is formed in places across the whole surface of the sample. The whole surface of this sample is read by the same scanner in full color at resolution of 600 dpi, and the image data obtained by reading is fed into the PC and image processing is carried out, and a 8-bit gray scale image of 4967×7020 dots is obtained. On this image, reference points are set vertically and laterally at intervals of 750 dots in a total of 40 pieces (lateral 5 points×vertical 8 points), and data of square reference region (reference data) of 128×128 dots from the center of reference point is extracted by image processing. The range corresponding to each reference region on the sample has black spot noise as shown in FIG. 15, and the reference data extracted from the 40 reference regions shows noise components corresponding to black spot noise.

Figure 16:
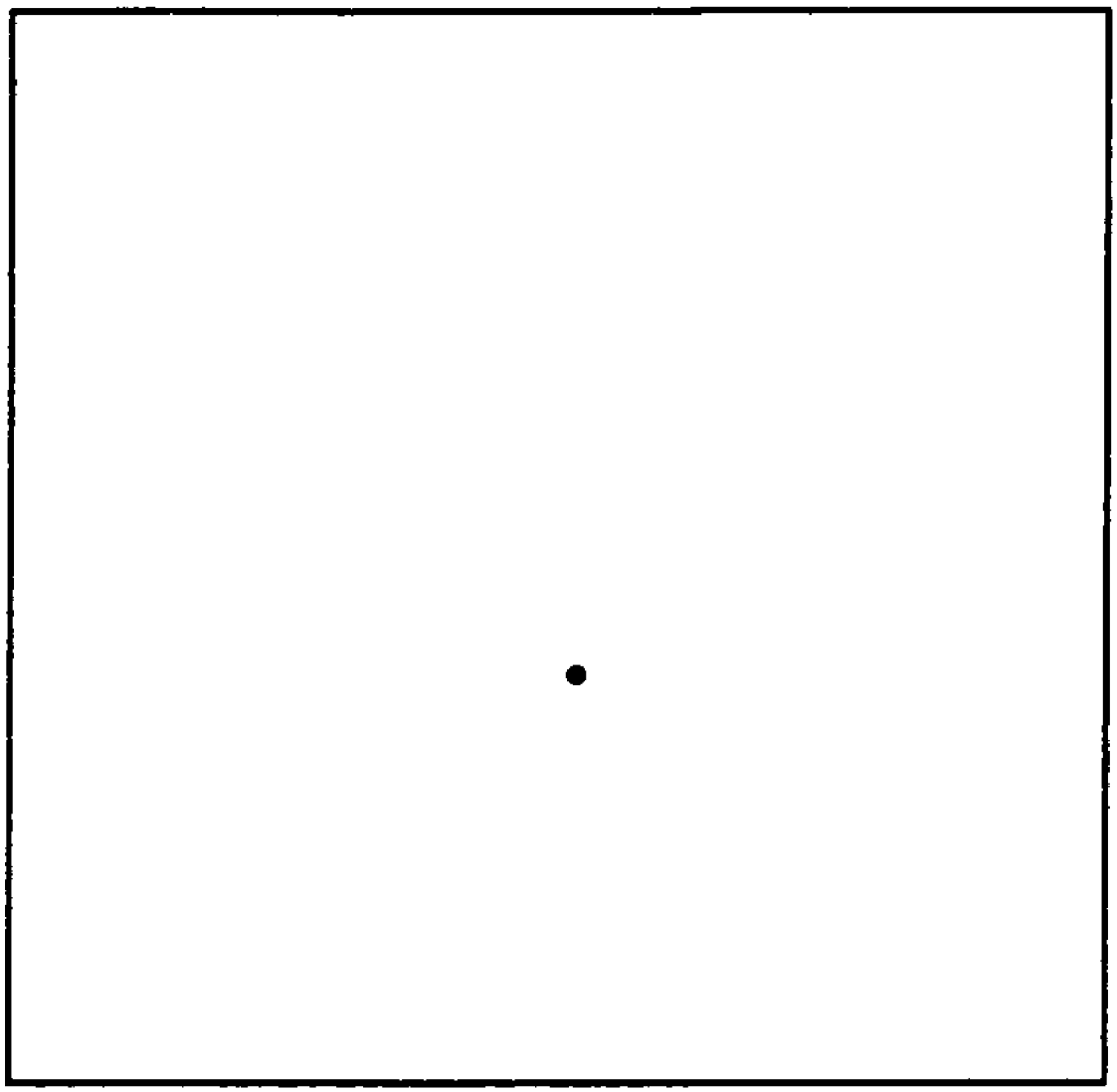
FIG. 16 is an image of an example of a cross-check region having black spot noise.

On the basis of sample placing position on original platen of scanner when reading for obtaining the reference data as reference position, the same sample on the original platen of scanner is (1) moved by several millimeters vertically and laterally, (2) rotated by about 1 degree clockwise, (3) rotated by about 1 degree counterclockwise, and (4) returned to reference position, and the whole surface is read by the scanner repeatedly (four times) while thus moving and rotating, in the same reading condition as the reading condition for obtaining reference data, and the image data obtained by reading is put into the PC, image processing is carried out, and 8-bit gray scale image of 4967×7020 dots is obtained, and from the center of 40 reference points, data of cross-check regions of 256×256 dots and 512×512 dots is extracted by image processing. As mentioned above, since black spot noise is scattered in 40 reference regions, black spot noise is also scattered in each cross-check region including any reference region as shown in FIG. 16, and hence in the cross-checking data extracted from each cross-check region, noise components corresponding to black spot noise are also scattered.

In succession, for checking FRR, correlation values of reference data extracted from a single reference region, with data of four cross-check regions each different in position or angle including the reference region are calculated in three manners, (1) no data is excluded from calculating scope, (2) data of a gradation value range from a minimum value of gradation values up to a cumulative frequency of 3% of reference data is excluded from the scope of calculation, and (3) data of a gradation value range from a minimum value of gradation values up to a cumulative frequency of 5% of reference data is excluded from the scope of calculation, and the maximum value of correlation values and normalized score of maximum value of correlation values are calculated, and this operation is repeated for the reference data of the 40 reference regions. In each single method of calculation, four calculation results are obtained for each reference region, and for 40 reference regions, a total of 160 calculation results are obtained. Combinations of size of reference regions and size of cross-check regions in the above computation are as follows.

| Size of reference region | Size of cross-check region |
|---|---|
| 128 × 128 dots | 256 dots × 256 dots |
| 128 × 128 dots | 512 dots × 512 dots |

For checking FAR, correlation values of reference data extracted from a single reference region, and data of the cross-check regions including the 39 reference regions different from this reference region (39 locations×4 types=156 cross-check regions) are calculated in the three manners described above, and the maximum value of correlation values and normalized score of maximum value of correlation values are calculated, and this operation is repeated for the reference data of the 40 reference regions. For each single method of calculation, 156 calculation results are obtained for each reference region, and for the 40 reference regions, a total of 6240 calculation results are obtained. Combinations used of size of reference regions and size of cross-check regions in this computation are the same as above.

By changing the threshold of maximum value of correlation values in 101 manners from 0.0 to 1.0 at increments of 0.01, and the normalized score of maximum value of correlation values in 101 manners from 0.0 to 10.0 at increments of 0.1, 10201 different combinations of maximum value of correlation values and normalized score of maximum value of correlation values are obtained, and in each combination, the FRR when applied to the data for checking FRR (calculation results of maximum value of correlation values and normalized score) is determined for each manner of calculation, and the FAR when applied to the data for checking FAR (calculation results of maximum value of correlation values and normalized score) is determined for each manner of calculation.

When processing is carried out to exclude the data in a gradation value range estimated to include the noise components of the reference data from the scope of the calculation of correlation values, the effect can be demonstrated by the changes in the number of combinations of thresholds which satisfy both FRR=0.00% and FAR=0.00%. The results of the experiment are shown below.

<No Data Excluded from Calculating Scope>

| Size of reference region | Size of cross-check region | Combination threshold |
|---|---|---|
| 128 × 128 dots | 256 dots × 256 dots | 1008 |
| 128 × 128 dots | 512 dots × 512 dots | 1316 |

<Data of Gradation Values in the Range from Minimum Value of Gradation Values Up to Cumulative Frequency of 3% Excluded from Calculating Scope>

| Size of reference region | Size of cross-check region | Combination threshold |
|---|---|---|
| 128 × 128 dots | 256 dots × 256 dots | 2093 |
| 128 × 128 dots | 512 dots × 512 dots | 2800 |

<Data of Gradation Values in the Range from Minimum Value of Gradation Values Up to Cumulative Frequency of 5% of Reference Data Excluded from Calculating Scope>

| Size of reference region | Size of cross-check region | Combinations of threshold |
|---|---|---|
| 128 × 128 dots | 256 dots × 256 dots | 1904 |
| 128 × 128 dots | 512 dots × 512 dots | 2581 |

Figure 17:
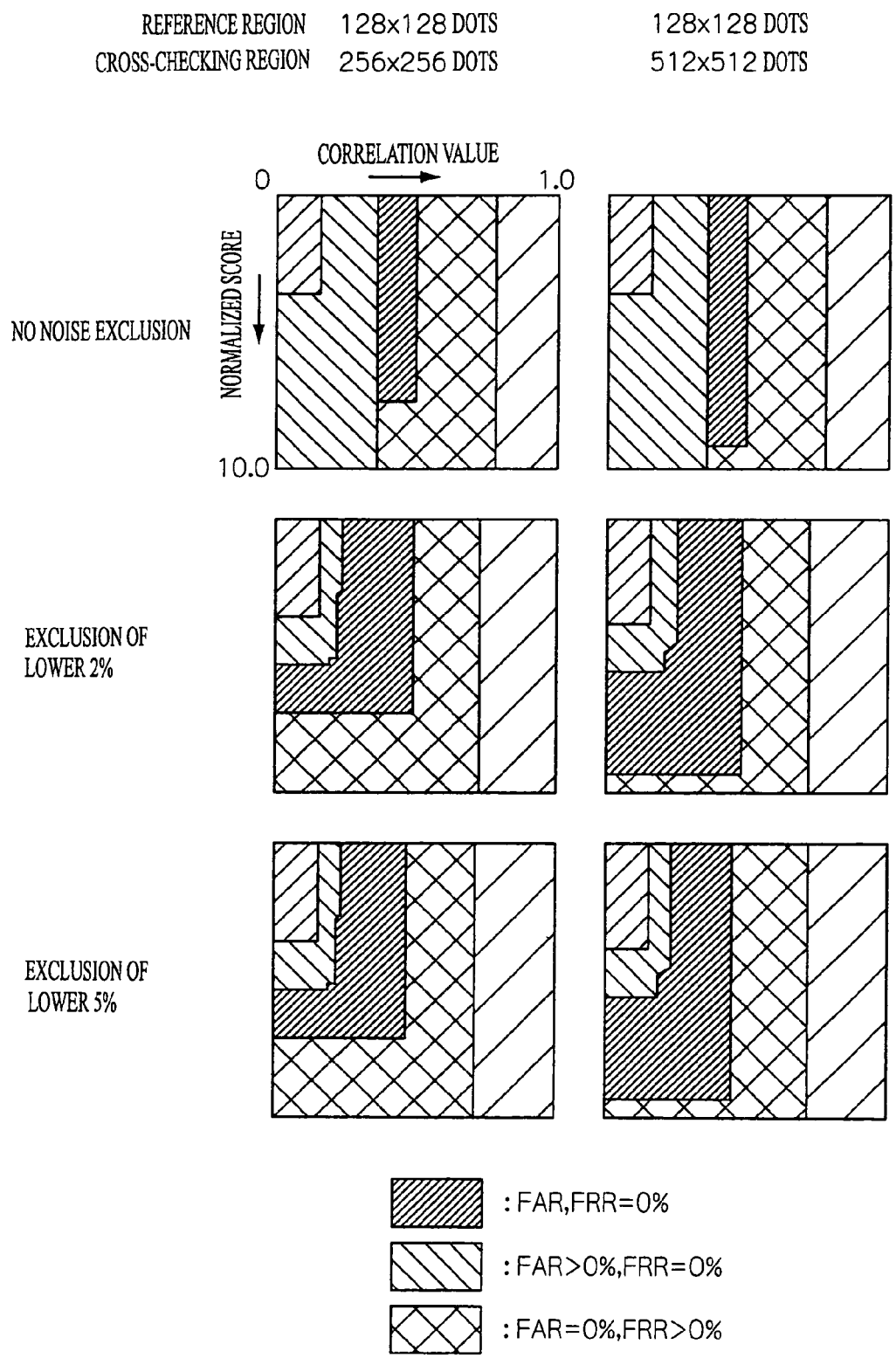
FIG. 17 is an image showing the relation between threshold values of maximum values of correlation values and normalized scores of maximum value of correlation values, and false acceptance rate (FAR) and FRR, in an experiment using the reference region and the cross-check region having black spot noise.

For visual recognition of the results of the experiment, FIG. 17 shows changes of FRR and FAR with respect to changes of the threshold of maximum value of correlation values and normalized score of maximum value of correlation values by plotting the maximum value of correlation values on the abscissa (0.00 at left end, 1.00 at right end), and the normalized score of maximum value of correlation values on the ordinate (0.0 at upper end, 10.0 at lower end). As is clear from FIG. 17, when the data in the gradation value range estimated to include the noise components is excluded from the calculating scope of correlation values, the area of the threshold region wherein FRR=0.00% and FAR =0.00% is increased. In authenticity determination, FAR is more important than FRR, and it is also confirmed that the region of FAR=0.00% and FRR>0.00% is extended in the direction of the abscissa. Therefore, by excluding the data in the gradation value range estimated to include noise components from the scope of calculating the correlation values, the precision required for setting the threshold for a good precision of authenticity determination is reduced, and it is hence shown that the authenticity determination precision is improved.

When the data in the gradation value range estimated to include noise components is excluded from the calculating scope of correlation values, the quantity of data used in computation is decreased, and if there is no varying density portion due to adherence by ink (or toner) or dirt in the reference region or cross-check region, the calculation precision of maximum value of correlation values and normalized score of maximum value of correlation values may be lowered, or the authenticity determination precision may be lowered. Accordingly, the inventors have also attempted the experiment on samples not having black spot noise. Results are shown in FIG. 18. As is clear from FIG. 18, when there is no varying density portion due to adherence by ink (or toner) or dirt in the reference region or cross-check region, and noise components are not mixed into the reference data or cross-checking data, even if the data in the gradation value range estimated to include noise components is excluded from the calculating scope of correlation values, the authenticity determination precision is not actually lowered.

Therefore, regardless of the presence of varying density portions due to staining of ink (or toner) or dirt in the reference region or cross-check region, if the data in a gradation value range estimated to include the noise components is always excluded from the calculating scope of correlation values, there is no adverse effect on authenticity determination precision even if there is no varying density portion present in the reference region or cross-check region, and it can be seen that the authenticity determination precision is enhanced if varying density portions are present in the reference region or cross-check region.

What is claimed is:

1. An authenticity determination method for determination of the authenticity of solid objects having a random and readable intrinsic characteristic distributed on the surface thereof, comprising:

acquiring reference data expressing the characteristic distributed on a genuine solid object, obtained by reading in advance the characteristic of the genuine solid object;

deriving cross-checking data expressing the characteristic distributed on the solid object to be determined for authenticity by reading the characteristic of the solid object to be determined for authenticity;

calculating, on the basis of the reference data and the cross-checking data, correlation values of data expressing the characteristic distributed in a first region of a specified size, on either the genuine solid object or the solid object to be determined for authenticity, with data expressing the characteristic distributed in a second region of the same size as the first region on the other solid object, and repeating this calculation when the position of the second region on other solid matter is moved within a region larger than the specified size;

determining the authenticity of the solid object to be determined for authenticity on the basis of the maximum value of the plural correlation values obtained by the calculations, and a characteristic quantity that expresses the shape of the distribution of correlation values derived from the plural correlation values; and outputting a determination result that indicates whether the solid object is authentic, based on the determining step, wherein each of the above steps is performed by one or more processors.

2. The authenticity determination method of claim 1, wherein the characteristic of the solid object can be read optically, and the reference data and cross-checking data are image data obtained by reading reflected light or transmitted light, by emitting light onto the genuine solid object and the solid object to be determined for authenticity.

3. The authenticity determination method of claim 2, wherein the solid object is a medium in sheet form or flat plate form, and the characteristic of the solid object is read by a flat bed type scanner.

4. The authenticity determination method of claim 1, wherein the correlation values are calculated by a normalized correlation method.

5. The authenticity determination method of claim 1, wherein the characteristic quantity that expresses the shape of the distribution of correlation values is the normalized score of the maximum value of correlation values, obtained by dividing the value resulting from subtracting the mean of the correlation values from the maximum value of the correlation values by the standard deviation of the correlation values, and authenticity of the solid object to be determined for authenticity is determined depending on whether the maximum value of the correlation values is more than a first specified value or not, and whether the normalized score of the maximum value of the correlation values is more than a second specified value or not.

6. The authenticity determination method of claim 2, wherein a gradation value range estimated to include noise components is set on the basis of the distribution of gradation values, in at least the reference data and/or the cross-checking data, and the correlation values are calculated after excluding data belonging to the set gradation value range.

7. The authenticity determination method of claim 6, wherein the reference data is obtained by reading out the reference data, obtained by reading the characteristic of the genuine solid object optically and recorded an a specified medium, from the specified medium, the gradation value range estimated to include noise components is set in the reference data on the basis of the obtained distribution of the gradation values of the reference data, and the correlation values are calculated after excluding the data belonging to the set gradation value range from the reference data.

8. The authenticity determination method of claim 6, wherein the gradation value range estimated to include noise components is set in a range from a maximum or minimum value of the gradation values until a specified value of cumulative frequency is reached, or in range of gradation values being greater or equal to AVE+nσ, or less than or equal to AVE−nσ, wherein the mean of the gradation values is AVE, the standard deviation of the distribution of the gradation values is σ, and n is a specific value.

9. The authenticity determination method of claim 7, wherein the gradation value range estimated to include noise components is set in a range from a maximum or minimum value of the gradation values until a specified value of cumulative frequency is reached, or in range of gradation values being greater or equal to AVE+nσ, or less than or equal to AVE−nσ, wherein the mean of the gradation values is AVE, the standard deviation of the distribution of the gradation values is σ, and n is a specific value.

10. The authenticity determination method of claim 1, wherein a reference region relating to the reference data, and a cross-check region relating to the cross-checking data are rectangular.

11. The authenticity determination method of claim 1, wherein the size of a cross-check region relating to the cross-checking data is larger than the size of a reference region relating to the reference data.

12. The authenticity determination method of claim 10, wherein a size of the cross-check region relating to the cross-checking data is larger than the size of the reference region relating to the reference data.

13. An authenticity determination apparatus for determination of the authenticity of solid objects having a random and readable intrinsic characteristic distributed on the surface thereof, comprising:

an acquiring unit for acquiring reference data expressing the characteristic distributed on a genuine solid object obtained by reading in advance the characteristic of the genuine solid object;

a reading unit for deriving cross-checking data expressing the characteristic distributed on the solid object to be determined for authenticity by reading the characteristic of the solid object to be determined for authenticity;

a calculating unit for calculating, on the basis of the reference data and the cross-checking data, correlation values of data expressing the characteristic distributed in a first region of specified size on either the genuine solid object or the solid object to be determined for authenticity, with data expressing the characteristic distributed in a second region of the same size as the first region on the other solid object, and repeating this operation when the position of the second region on other solid matter is moved within a region larger than the specified size; and a determination unit for determination of the authenticity of the solid object to be determined on the basis of the maximum value of plural correlation values obtained by the calculations, and a characteristic quantity that expresses the shape of the distribution of correlation values derived from the plural correlation values.

14. A computer readable storage medium having a computer-executable program embedded thereon, the program including computer executable instructions to be executed by a computer comprising a reading device for reading a random and intrinsic characteristic of a solid object distributed along the surface of the solid object, the program, when executed by the computer, causing the computer to execute:

an acquiring command for acquiring reference data expressing the characteristic distributed on a genuine solid object obtained by reading in advance the characteristic of the genuine solid object;

a reading control command for deriving cross-checking data expressing the characteristic distributed on the solid object to be determined for authenticity by reading the characteristic of the solid object to be determined for authenticity;

a calculating command for calculating, on the basis of the reference data and the cross-checking data, correlation values of data expressing the characteristic distributed in a first region of specified size on either the genuine solid object or the solid object to be determined for authenticity, and data expressing the characteristic distributed in a second region of the same size as the first region on the other solid object, and repeating this operation when the position of the second region on the other solid object is moved within a region larger than the specified size; and a determination command for determining the authenticity of the solid object to be determined on the basis of the maximum value of plural correlation values obtained by the calculation, and a characteristic quantity that expresses the shape of distribution of correlation values derived from the plural correlation values.

\* \* \* \* \*